US009384637B2

(12) United States Patent
Graef et al.

(10) Patent No.: US 9,384,637 B2
(45) Date of Patent: Jul. 5, 2016

(54) PICKER FOR USE WITH AN AUTOMATED BANKING MACHINE

(71) Applicant: Diebold Self-Service Systems, division of Diebold, Incorporated, North Canton, OH (US)

(72) Inventors: H. Thomas Graef, Bolivar, OH (US); Michael Harty, Canton, OH (US); William Beskitt, Canton, OH (US); Sean Haney, North Canton, OH (US); Robert W Barnett, Louisville, OH (US); Bryan Simmons, North Canton, OH (US)

(73) Assignee: Diebold Self-Service Systems, Division of Diebold, Incorporated, North Canton, OH (US)

( * ) Notice: Subject to any disclaimer, the term of this patent is extended or adjusted under 35 U.S.C. 154(b) by 174 days.

(21) Appl. No.: 14/215,644

(22) Filed: Mar. 17, 2014

(65) Prior Publication Data

US 2014/0263620 A1 Sep. 18, 2014

Related U.S. Application Data

(60) Provisional application No. 61/852,326, filed on Mar. 15, 2013.

(51) Int. Cl.

*G06Q 40/00* (2012.01)
*G07D 11/00* (2006.01)

(Continued)

(52) U.S. Cl.

CPC ................ *G07F 19/201* (2013.01); *B65H 3/02* (2013.01); *B65H 3/0669* (2013.01); *B65H 3/5261* (2013.01); *B65H 5/062* (2013.01); *B65H 7/08* (2013.01); *B65H 7/12* (2013.01); *B65H 7/20* (2013.01); *B65H 9/002* (2013.01); *B65H 29/14* (2013.01); *B65H 31/02* (2013.01); *B65H 83/00* (2013.01); *B65H 83/025* (2013.01); *G07D 11/0078* (2013.01); *G07D 11/0081* (2013.01);

(Continued)

(58) Field of Classification Search

CPC ........ B65H 7/12; B65H 7/125; B65H 3/0669; B65H 3/00; B65H 3/42; B65H 3/02; B65H 3/5261; B65H 7/08; B65H 7/20; G07F 19/201; G07F 19/203; G07D 11/0081

USPC .......................................... 235/379; 271/109

See application file for complete search history.

(56) References Cited

U.S. PATENT DOCUMENTS

| | | |
|---|---|---|
| 5,141,127 A | 8/1992 | Graef |
| 5,970,890 A | 10/1999 | Harry |

(Continued)

*Primary Examiner* — Laura Gudorf
(74) *Attorney, Agent, or Firm* — Black, McCuskey, Souers & Arbaugh, LLPA

(57) ABSTRACT

In an example embodiment, there is disclosed herein a picker that is operable to separate an individual sheet from a stack of sheets. The picker has a first rotatable picker member that includes a first high friction peripheral arcuate segment, where the first picker member is rotatable about an axis, a second rotatable member that includes a second high friction peripheral arcuate segment, wherein the second picker member is rotatable about the axis, and a drive in operative connection with the first and second rotatable picker members. The stack includes a bounding sheet having a sheet face bounding a side of the stack. The first and second arcuate segments are operable to concurrently engage the sheet face. The first and second picker members are operable to be separately rotationally movable about the axis responsive to operation of the drive.

14 Claims, 18 Drawing Sheets

(51) Int. Cl.

| | |
|---|---|
| ***B65H 3/06*** | (2006.01) |
| ***G07F 19/00*** | (2006.01) |
| ***B65H 7/20*** | (2006.01) |
| ***B65H 7/12*** | (2006.01) |
| ***B65H 3/02*** | (2006.01) |
| ***B65H 3/52*** | (2006.01) |
| ***B65H 5/06*** | (2006.01) |
| ***B65H 7/08*** | (2006.01) |
| ***B65H 9/00*** | (2006.01) |
| ***B65H 83/00*** | (2006.01) |
| ***B65H 29/14*** | (2006.01) |
| ***B65H 31/02*** | (2006.01) |
| ***B65H 83/02*** | (2006.01) |
| *B65H 29/60* | (2006.01) |

(52) U.S. Cl.

CPC .............. *G07F 19/203* (2013.01); *B65H 29/60* (2013.01); *B65H 2301/4212* (2013.01); *B65H 2404/1531* (2013.01); *B65H 2404/264* (2013.01); *B65H 2404/268* (2013.01); *B65H 2404/2691* (2013.01); *B65H 2404/694* (2013.01); *B65H 2405/3322* (2013.01); *B65H 2511/242* (2013.01); *B65H 2511/524* (2013.01); *B65H 2513/104* (2013.01); *B65H 2513/41* (2013.01); *B65H 2701/1311* (2013.01); *B65H 2701/1827* (2013.01); *B65H 2701/1912* (2013.01)

(56) References Cited

U.S. PATENT DOCUMENTS

| | | | | |
|---|---|---|---|---|
| 6,170,818 | B1 | 1/2001 | Eastman | |
| 6,302,393 | B1 | 10/2001 | Beskitt | |
| 6,331,000 | B1 | 12/2001 | Beskitt | |
| 6,378,770 | B1 * | 4/2002 | Clark | G07D 11/0057 235/379 |
| 6,682,068 | B1 * | 1/2004 | Haney | B65H 3/047 271/213 |
| 7,021,529 | B2 | 4/2006 | Enright | |
| 7,108,175 | B2 | 9/2006 | Eastman | |
| 7,195,237 | B2 | 3/2007 | Graef | |
| 7,322,481 | B2 | 1/2008 | Utz | |
| 7,392,937 | B1 | 7/2008 | Green | |
| 7,404,515 | B1 | 7/2008 | Shepley | |
| 7,418,592 | B1 | 8/2008 | Zajkowski | |
| 7,419,093 | B1 | 9/2008 | Blackson | |
| 7,428,984 | B1 | 9/2008 | Crews | |
| 7,431,204 | B1 | 10/2008 | Block | |
| 7,438,219 | B1 | 10/2008 | Crews | |
| 7,556,259 | B2 | 7/2009 | Graef | |
| 7,611,140 | B2 | 11/2009 | Graef | |
| 7,891,546 | B1 * | 2/2011 | Steinbach | G06Q 20/042 235/375 |
| 7,959,071 | B1 | 6/2011 | Crews | |
| 8,490,868 | B1 | 7/2013 | Kropf | |
| 8,540,144 | B2 | 9/2013 | Graef | |
| 2001/0013551 | A1 | 8/2001 | Ramachandran | |
| 2001/0041986 | A1 | 11/2001 | Graef | |
| 2003/0037421 | A1 | 2/2003 | Graef | |
| 2003/0107165 | A1 * | 6/2003 | Werner | B65H 3/063 271/121 |
| 2003/0116478 | A1 | 6/2003 | Laskowski | |
| 2004/0124240 | A1 | 7/2004 | Utz | |
| 2005/0203847 | A1 | 9/2005 | Drummond | |
| 2005/0280200 | A1 * | 12/2005 | Sagi | B65H 9/002 271/185 |
| 2007/0138258 | A1 | 6/2007 | Magee | |
| 2007/0181676 | A1 | 8/2007 | Mateen | |
| 2007/0199948 | A1 | 8/2007 | Ramachandran | |
| 2007/0228152 | A1 | 10/2007 | Washington | |
| 2007/0235520 | A1 | 10/2007 | Smith | |
| 2008/0091601 | A1 | 4/2008 | Green | |
| 2013/0153654 | A1 | 6/2013 | Graef | |

* cited by examiner

PICKER FOR USE WITH AN AUTOMATED BANKING MACHINE

CROSS REFERENCE TO RELATED APPLICATIONS

This application claims the benefit under 35 U.S.C. §119 of U.S. Provisional Application No. 61/852,326 filed Mar. 15, 2013, the entire contents of which are incorporated by reference herein.

The present disclosure is directed to a picker suitable for use by an automated teller machine to dispense currency, accept currency, and/or recycle currency.

BACKGROUND

Automated banking machines may include a card reader that operates to read data from a bearer record, such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of a printer in the automated banking machine and provided to the user. A common type of automated banking machine used by consumers is an automated teller machine, which enables customers to carry out banking transactions. Banking transactions carried out by such machines may include the dispensing of cash, the making of deposits, the transfer of funds between accounts and account balance inquiries. Other types of transactions may include the acceptance of cash, the acceptance of financial checks, the transfer of funds to a mobile wallet associated with a portable wireless device, the transfer of funds to a reloadable stored value account or other financial transfers. The types of transactions a customer can carry out with an automated banking machine are determined by the capabilities of the particular machine and the programming associated with machine.

Other types of automated banking machines may be operated by merchants to carry out commercial transactions. Such transactions may include for example, the acceptance of deposit bags, the receipt of checks or other financial instruments, the dispensing of rolled coins or other transaction types required by merchants. Still other types of automated banking machines may be used by service providers in a transaction environment such as at a bank, to carry out financial transactions. Such transactions may include for example, the counting and storage of currency notes or other instrument sheets, the dispensing of notes or other sheets, the imaging of checks or other types of financial instruments, and other types of service provider transactions. For purposes of this disclosure, an automated banking machine, automated transaction machine or automated teller machine shall be deemed to include any machine that may be used to electronically carry out transactions involving automated transfers of value. Automated banking machines may benefit from improvements.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus that comprises a picker operable to separate an individual sheet from a stack of sheets. The picker comprises a first rotatable picker member that includes a first high friction peripheral arcuate segment, where the first picker member is rotatable about an axis, a second rotatable member that includes a second high friction peripheral arcuate segment, wherein the second picker member is rotatable about the axis, a drive in operative connection with the first and second rotatable picker members, and a stripper member that is configured generally to prevent sheets other than the bonding sheet from being separated from the stack by rotation of the first and second picker members in a first rotational direction. The stack includes a bounding sheet having a sheet face bounding a side of the stack. The first and second arcuate segments are operable to concurrently engage the sheet face, The first and second picker members are operable to be separately rotationally movable about the axis responsive to operation of the drive.

In accordance with an example embodiment, there is disclosed herein an apparatus comprising an automated banking machine that operates responsive at least in part to data read from data bearing records. The automated banking machine comprises a housing, an input device supported by the housing, wherein the input device is operative to receive inputs from users of the automated banking machine, an output device operative to provide outputs, a processor associated with the automated banking machine that is operatively coupled with the input device and output device, and a picker that is operable to separate an individual sheet from a stack of sheets in response to instructions received from the processor. The input device includes a card reader that is operative to read data from user cards, wherein read data is from user cards is usable to identify a financial account. The processor is operative to cause a determination to be made that card data read from a user card through operation of the card reader corresponds to a financial account on which a transaction is authorized to be conducted through operation of the machine, and cause a financial transfer involving the financial account responsive at least in part to the determination.

The picker comprises a first rotatable picker member that includes a first high friction peripheral arcuate segment, where the first picker member is rotatable about an axis, a second rotatable member that includes a second high friction peripheral arcuate segment, wherein the second picker member is rotatable about the axis, a drive in operative connection with the first and second rotatable picker members, and a stripper member that is configured generally to prevent sheets other than the bonding sheet from being separated from the stack by rotation of the first and second picker members in a first rotational direction. The stack includes a bounding sheet having a sheet face bounding a side of the stack. The first and second arcuate segments are operable to concurrently engage the sheet face. The first and second picker members are operable to be separately rotationally movable about the axis responsive to operation of the drive.

In accordance with an example embodiment, there is disclosed herein a tangible, non transitory computer readable medium of instructions for execution by a processor, and when executed operable to operate a drive that is coupled with a picker that is operable to separate an individual sheet from a stack of sheets. The drive is coupled with a first rotatable picker member that includes a first high friction peripheral arcuate segment, where the first picker member is rotatable about an axis, and a second rotatable member that includes a second high friction peripheral arcuate segment, wherein the second picker member is rotatable about the axis. The picker further comprises a stripper member that is configured generally to prevent sheets other than the bonding sheet from being separated from the stack by rotation of the first and second picker members in a first rotational direction. The instructions are further operable to separately rotate the first and second picker members about the axis.

DESCRIPTION OF EXAMPLE EMBODIMENTS

Figure 1:
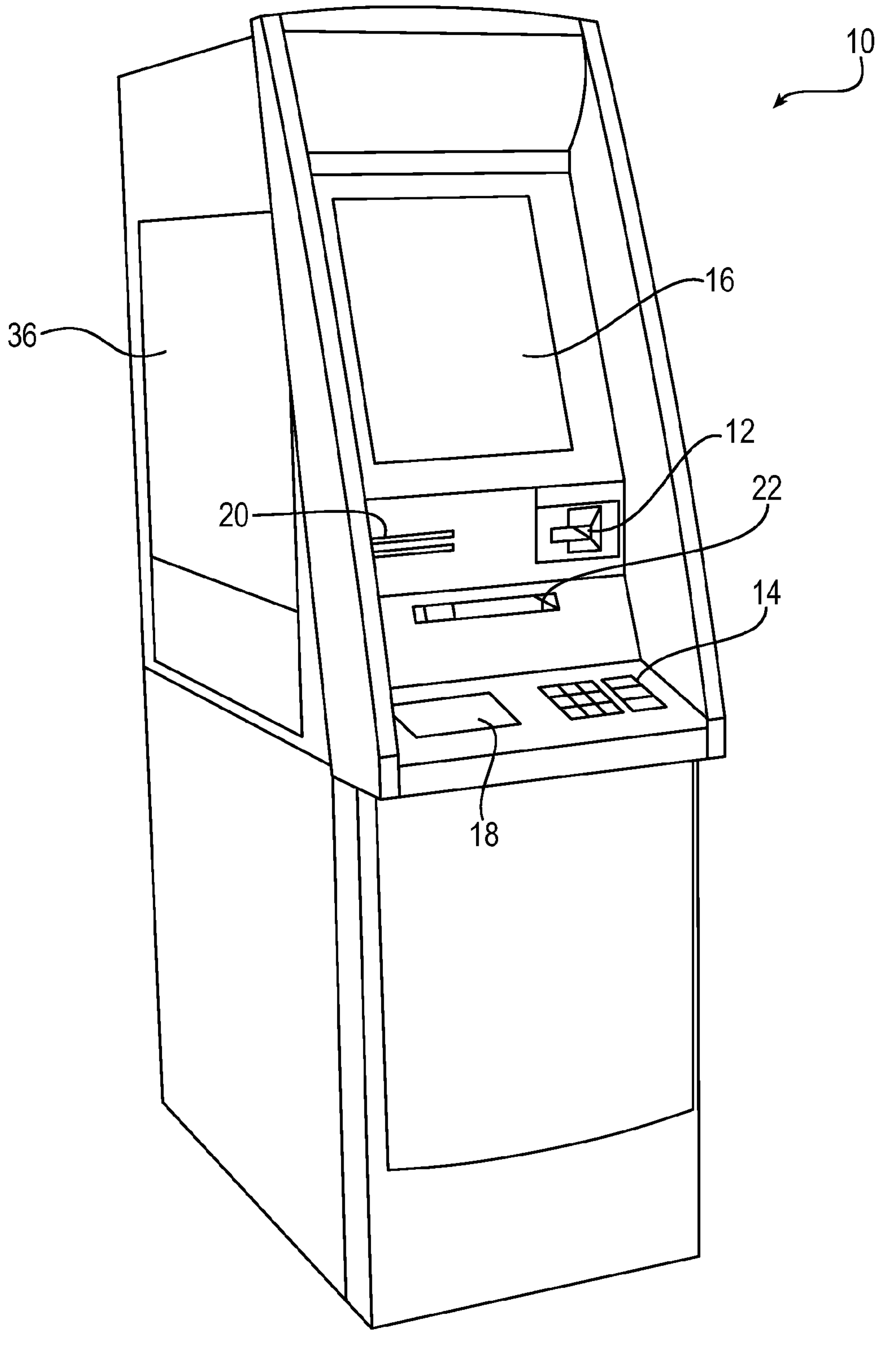
FIG. 1 is an isometric view of an example automated banking machine.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring now to the drawings, and particularly FIG. 1, there is shown therein an example automated banking machine generally indicated 10. Automated banking machine 10 may be used to carry out transactions involving transfers of value. The example automated banking machine includes user input devices, including a card reader 12. Card reader 12 may be used to read data from user cards. This may include for example, reading data corresponding to financial accounts from magnetic stripe cards, such as credit cards and debit cards. In alternative arrangements, card reader 12 may include a card reader that is operable to read smart cards or wireless cards, such as RFID cards or near field communication (NEC) type cards. Other types of automated banking machines may include other types of reading devices that are usable for purposes of receiving data usable to identify a user and/or a financial account.

The example automated banking machine 10 further includes a keypad 14. In the example arrangement, the keypad 14 is an encrypting PIN pad (EPP). The keypad 14 may be used for providing inputs of personal identification numbers, as well as amount values and other user inputs to the machine. Machine 10 further includes a display 16. Display 16 of the example embodiment includes a touch screen display. Display 16 provides visible outputs to users of the machine. The outputs include instructions for operation of the machine, as well as user selectable transaction outputs. In the example arrangement, display 16 also acts as an input device, which enables users to provide inputs by touching areas of the display that correspond to user selectable outputs. Contact with the touch screen display enables users to provide inputs that correspond to display produced outputs.

The example machine 10 further includes an auxiliary display 18. Auxiliary display 18 of the example embodiment also includes a touch screen display. The example auxiliary display 18 is operative to provide outputs similar to those shown on the display 16. The auxiliary display also serves to act as an input device through which users can provide inputs to the machine. The display 18 may be used for example, by persons in wheelchairs, or other disabled individuals who may find it difficult to provide machine inputs by contact with the touch screen display 16. The example machine 10 further includes a printer 20. Printer 20 operates to provide printed receipts or other documents to users of the machine. Machine 10 further includes a user access opening 22. User access opening 22 of the example embodiment is usable to deliver sheets or other items from the machine to machine users. In other arrangements, the user access opening 22 may be used to input sheets or items into the machine. The types of items that are delivered from or received into the user access opening 22 depends on the particular types of transaction function devices which may be included in the machine. For example, some example machines may include a cash dispenser 24 that operates to dispense cash such as currency notes that are stored in the machine to machine users. Other example machines may include a check acceptor 26. The check acceptor 26 may operate to receive financial checks into the machine. Such checks may be evaluated, imaged and otherwise processed through operation of the machine.

Other example automated banking machines may include a cash acceptor 28. Cash acceptor 28 may receive currency bills (alternatively referred to herein as notes) or other currency items from users through the user access opening 22. The cash acceptor may operate to analyze the received currency to determine if it is valid and the machine may operate to store the currency and credit a user's account for valid currency bills received. Other example embodiments may include a cash recycler 30. The cash recycler may operate to receive bills from users through the user access opening 22, to evaluate the bills for validity and store the bills in storage areas within the machine. In addition, customers who request cash withdrawals from the machine may receive currency bills stored in the machine, through operation of the cash recycler mechanism, that have been identified as valid. Such cash may then be dispensed to other users through the user access opening 22. Of course it should be understood that these particular types of transaction function devices are example, and in other example machines different, more or fewer transaction function devices may be included in a machine.

Example embodiments of automated banking machines may include features such as those described in U.S. patent application Ser. No. 13/765,415, filed Feb. 12, 2013, the disclosure of which is incorporated herein by reference in its entirety. Other example automated banking machines may include features like those described in U.S. patent application Ser. No. 13/799,802, filed Mar. 13, 2013, the disclosure of which is incorporated herein by reference in its entirety. Other automated banking machines may include features like those described in U.S. patent application Ser. No. 13/793,070, filed Mar. 11, 2013, the disclosure of which is incorporated herein by reference in its entirety. Further incorporated herein by reference are the entire disclosures of U.S. Pat. Nos. 7,438,220; 7,438,222; 7,438,221; 7,438,219; 7,431,204; 7,433,844; 7,431,206; 7,428,984; 7,424,972; 7,416,112;

7,418,592; 7,419,089; 7,419,093; 7,404,515; 7,405,724; 6,702,181; and 7,392,937. These patents disclose devices and systems that may be used to carry out transactions, as well as features, methods and capabilities that may be used in connection with example devices, methods and systems of the type described herein.

Figure 2:
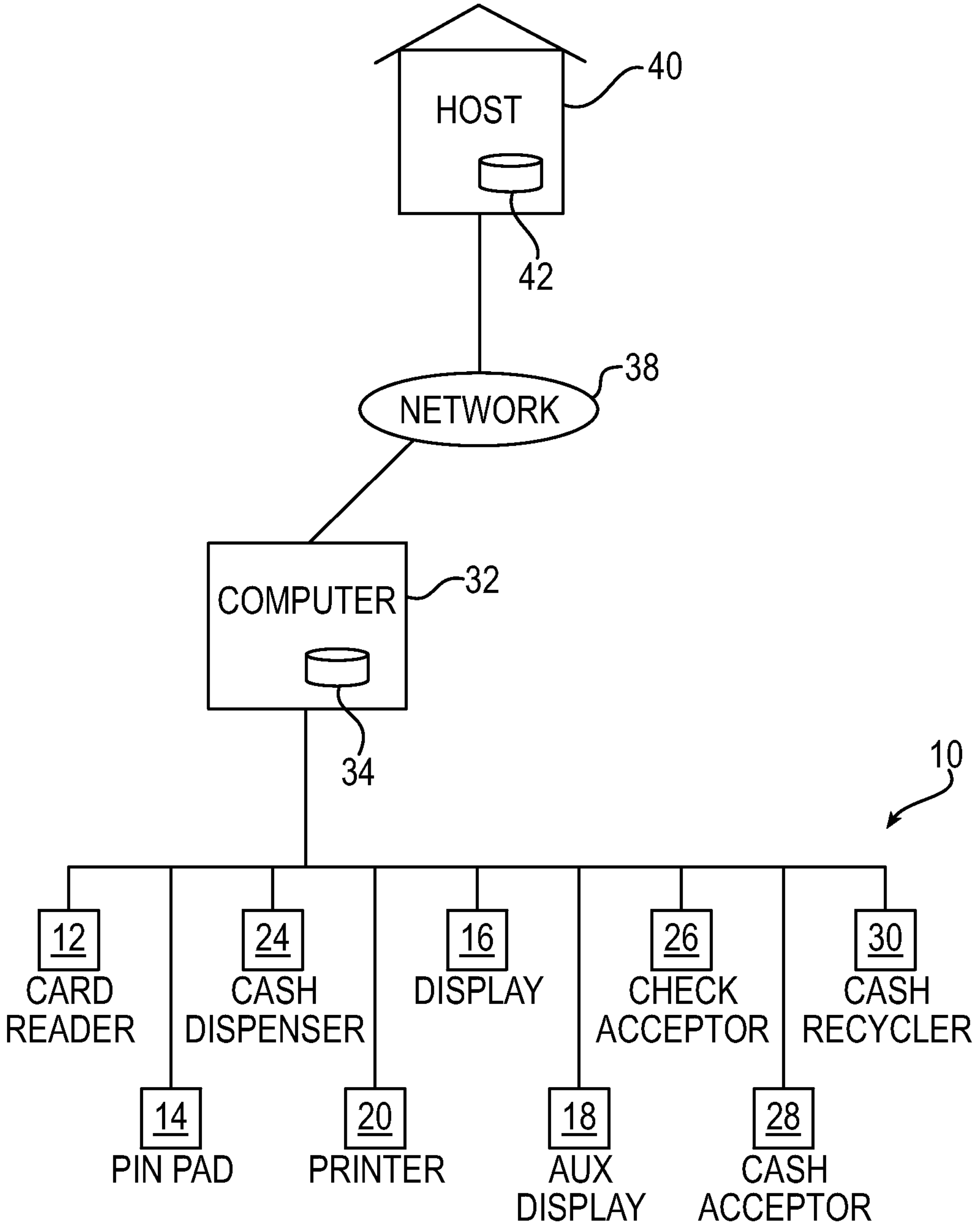
FIG. 2 is a schematic view of functional components included in an automated banking machine and an associated financial system.
Figure 3:
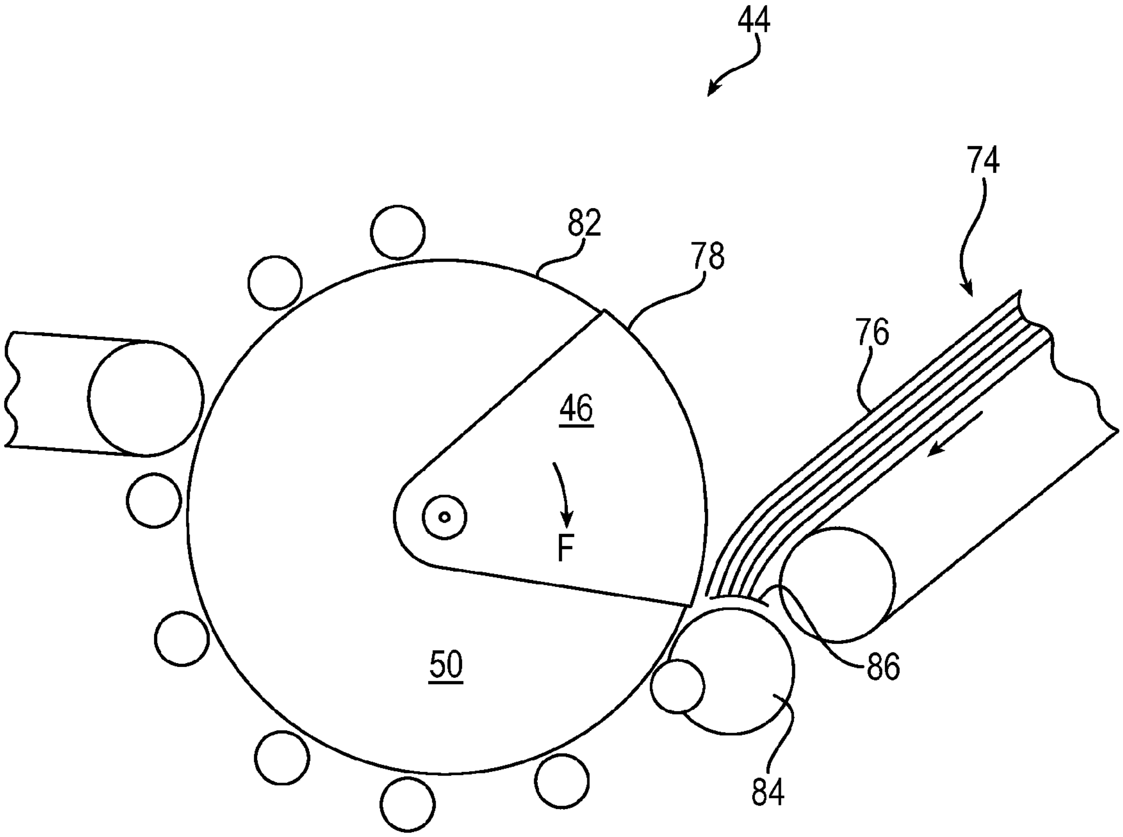
FIGS. 3 through 16 are schematic views of a picker mechanism that is used for separating sheets from a stack and transporting and aligning sheets.
Figure 4:
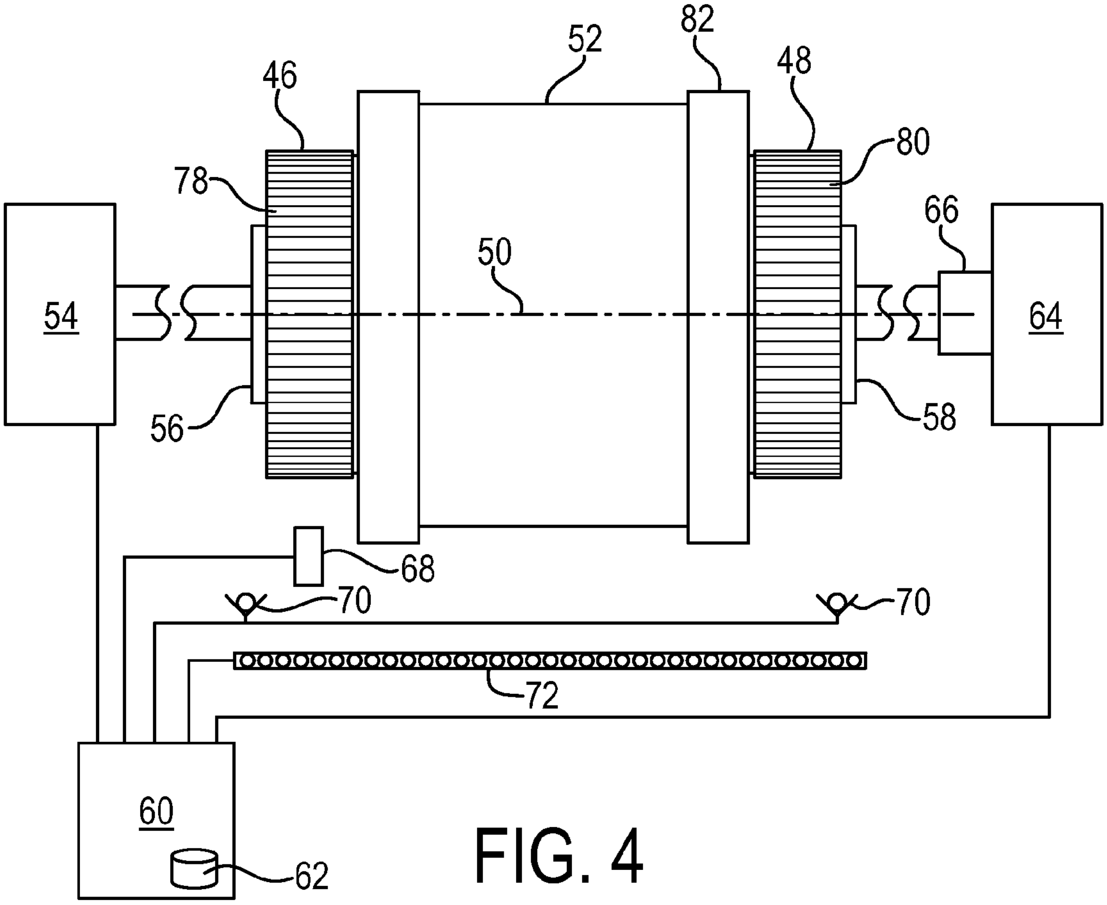

FIG. 2 shows schematically the components that may be included in example embodiments of the automated banking machine 10, as well as the system in which it operates. The automated banking machine 10 is associated with a computer 32 that is alternatively referred to herein as a controller or a processor. Computer 32 operates in accordance with its programming, which includes computer executable instructions that are stored in one or more data stores schematically indicated 34. The data stores utilized in connection with example embodiments may include one or more different types of articles from which computer executable instructions may be read. These may include magnetic storage, optical storage, flash memory storage, firmware, hard disc drives, solid state drives or other types of data storage drives. In some example embodiments, the computer 32 may be housed within the housing 36 of the automated banking machine. In other example arrangements, the computer associated with the machine may include a remote computer, such as is disclosed in U.S. patent application Ser. No. 13/769,452, filed Feb. 18, 2013, the disclosure of which is incorporated herein by reference in its entirety.

Example embodiments of the housing may further include one or more secure chest portions. Articles of value such as currency notes, checks or other items may be stored within one or more secure chests of the machine. Example embodiments may include features like those disclosed in U.S. patent application Ser. No. 13/629,217, filed Sep. 27, 2012, the disclosure of which is incorporated herein by reference in its entirety. Of course it should be understood that in alternative examples, other approaches may be used.

In some example embodiments, the automated banking machine operates to cause financial transfers for authorized users of the machine. In example embodiments, card data is read from a user card through operation of the card reader 12. The computer operates to determine whether the card data corresponds to a financial account that is authorized to conduct a transaction through operation of the automated banking machine. The computer further operates to prompt users to input additional identifying data. In the example embodiment, a user is prompted to input their personal identification number (PIN) through the keypad 14. Responsive to reading data from the card and the input keypad data, the machine operates in accordance with its programming to prompt the user to provide at least one input which indicates the transaction type that the user wishes to conduct. For example, the user may be presented through the display with a menu of different transactions that the user can select. These may include for example a cash dispensing transaction. The user may also be prompted to indicate from which of their accounts corresponding to their card data, such as a checking or savings account, the user wishes to receive dispensed cash.

In the example arrangement, the computer 32 associated with the automated banking machine also operates to cause the user to be prompted to provide other inputs that correspond to the particular transaction the user wishes to conduct. For example, if the user is requesting a cash dispense transaction, the machine will prompt the user to provide inputs corresponding to the value of cash the user wishes to receive. Of course it should be understood that the user may be prompted to provide different inputs depending on the particular type of transaction that the user wishes to conduct.

Responsive to the user providing card data and/or other identifying data, as well as transaction information, the computer 32 of the example embodiment operates in accordance with its programming to send one or more messages through a network schematically indicated 38. The network may include a public or private network of an appropriate type for communicating transaction messages. In the example arrangement, the automated banking machine messages are communicated to a transaction processing host generally indicated 40. The transaction processing host includes one or more computers, which include one or more data stores schematically indicated 42. In some example arrangements, the financial transaction host 40 may be associated with a financial institution or other entity that holds data regarding user accounts.

In the example arrangement, the financial transaction host 40 operates to determine if the card data input by the user corresponds to an account that is authorized to conduct a transaction through operation of the machine. Responsive to the determination that the card data corresponds to an authorized account, the host 40 operates in accordance with its programming to determine if the user identifying input PIN data corresponds to an authorized user of the account. This analysis is done to assure that the person operating the automated banking machine is a person who is authorized to conduct a transaction on the account. Responsive to verifying that the customer input PIN data is appropriate for the account, the computer 40 then operates in accordance with its programming to determine if the particular user account is authorized to conduct the transaction that the user has requested. For example, if the user has requested a cash withdrawal transaction, the host computer is operative to determine if the account includes a balance that is at least as great as the value of the cash that the user has requested. If the host determines that the user's account has sufficient cash to carry out the transaction, the host operates to send one or more messages to the machine 10, which cause the machine to carry out the transaction. Of course if the users account does not have sufficient value to accomplish the transaction, one or more messages are sent to the machine that cause the machine to advise the user that the requested transaction cannot be carried out.

In the example arrangement, responsive to the machine receiving the one or more messages from the host computer which indicate that the transaction is authorized, the computer 32 associated with the machine operates in accordance with its programming to cause the appropriate devices in the machine to operate to carry out the requested transaction. For example, if the requested transaction includes a cash dispense, the computer operates to cause the cash dispenser to operate to dispense currency notes that correspond to the requested amount. The computer may also operate in accordance with its programming to cause other devices to operate, such as to advise the user that the transaction is being processed, and to take the dispensed cash when the cash has been dispensed. Of course the operation of the particular devices will depend on the nature of the transaction that the user has requested.

In the example arrangement, if the transaction is enabled to be carried out, the computer 32 associated with the automated banking machine operates to send one or more messages to the host computer 40. These messages are indicative that the requested transaction was able to be carried out through operation of the machine. The host computer then operates to cause a financial transfer either to or from the financial account, depending on the particular transaction. In this example which includes a cash dispense transaction, the host computer is operative to assess the financial account for the value of cash dispensed. Of course it should be understood that for other types of transactions, such as transactions that involve receiving cash and/or checks, the financial account may be credited for the value associated with received cash or checks. Of course it should be understood that these approaches are example.

Further, in the example arrangement, the computer 32 operates in accordance with its programming to cause the printer 20 to provide the user with a receipt for the accomplished transaction. This provides the user with a record of the transactions that they have conducted at the automated banking machine. The computer also operates to carry out any additional functions that are required to be carried out through operation of the associated devices, such as advising the user through the display that the receipt is being printed and/or prompting the user to take their receipt. The computer may then operate in accordance with its programming to ask the user if they wish to conduct an additional transaction. The user may provide inputs to request additional transaction types. Alternatively, the user may provide inputs to terminate the transaction session. In response to the user providing such an input, the user's card is returned and the computer may cause the machine to return to a waiting state in which the machine is ready to conduct a transaction for another user. Of course it should be understood that these approaches are example, and in other arrangements other approaches may be used.

Example automated banking machines may include devices to receiving and/or dispensing sheets to users. This may include for example, machines that include the capability of receiving or delivering sheets in the form of currency bills and/or financial checks. Such machines may include machines with features such as those described in U.S. Pat. Nos. 5,850,075 and/or 6,170,818, the disclosures of each of which are incorporated herein by reference in its entirety. Machines that include the capabilities for receiving and dispensing sheets may include a customer accessible area which can receive a stack of sheets from a user and also deliver a stack of sheets to a user from the machine. An example of machines having such mechanisms are disclosed in U.S. patent application Ser. No. 13/765,415, filed Feb. 12, 2013, the disclosure of which is incorporated herein by reference in its entirety.

FIGS. 3 through 16 show schematically a picker generally indicated 44, which may be used in connection with machines that receive and/or deliver sheets to users. The example picker 44 operates to separate individual sheets from a stack, and to align and center sheets with regard to a sheet path. This enables the sheets to be delivered in suitable aligned condition for processing by other devices included in the machine. The example picker 44 also includes the capability for receiving sheets that have been handled or otherwise processed by the machine and moving them into a storage area, such as for example a customer accessible area of the machine from which the sheets may be taken. While the example picker 44 is described as taking sheets from and delivering sheets to a customer accessible area of the machine, it should be understood that the principles of the example picker may also be used in devices that are not customer accessible within the machine. This may include for example, delivering sheets from sheet storage areas and note holding canisters that are housed within the machine.

The example picker 44 includes first and second rotatable picker members 46 and 48. Picker members of the example arrangement are generally triangular shaped members. However. in other arrangements. the picker members may have other shapes. The example picker members 46 and 48 are rotatable about an axis 50. Picker members 46 and 48 are disposed on opposed axial sides of a central member 52. Central member 52 is generally not rotatable about the axis 50.

Example picker members 46 and 48 are rotationally moved responsive to operation of a drive 54 that is shown schematically. Drive 54 includes one or more electrical motors or other suitable mechanisms that are capable of causing selective rotational movement of the picker members 46 and 48. It should be understood that although only one drive 54 is shown, other arrangements may include multiple drives, including separate drive mechanisms that move the respective picker members.

In the example arrangement. the picker members are operatively connected to the drive 54 through a pair of clutches 56 and 58. Clutches 56 and 58 enable selective engagement and disengagement of each respective picker member from the drive. This enables each respective picker member to be selectively rotationally movable. Thus, as will be appreciated from the following description. while the picker members 46 and 48 will generally move in angularly aligned relation for purposes of separating and moving sheets, the capability of the picker members to move separately facilitates separating and aligning sheets.

The clutch mechanisms 56 and 58 are selectively engaged and disengaged responsive to a control circuit 60. Control circuit 60 includes one or more processors that are connected through appropriate driver mechanisms to control drive 54 and clutches 56 and 58. The control circuit 60 includes one or more data stores 62, which include program instruction associated with operation of the picker 44. As can be appreciated, the control circuit 60 is in operative communication with the computer 32 of the automated banking machine. Picker 44 operates in response to instructions provided by the computer to carry out the computer directed functions.

In the example picker, a further drive 64 is in operative connection with the control circuit 60. Drive 64 may include one or more electric motors or other suitable mechanisms for imparting movement to the picker members. In the example arrangement, the drive 64 operates to move picker members 46 and 48, as well as the central member 52 in an axial direction along axis 50. This may be done through one or more suitable mechanisms, such as a screw drive connection 66 or other suitable connection that enables rotational movement of the picker members while achieving axial movement of the connected mechanism. The example control circuit 60 is also connected to a plurality of sensors. These include for example a doubles detector 68, skew sensors 70 and one or more centering sensors 72. Of course, these sensors are example and in other arrangements other or additional sensors and control circuit may be associated with the picker.

Referring again to FIG. 3, picker 44 operates to separate sheets one at a time from a stack 74. Stack 74 is bounded in an upper side as shown, by a bounding sheet 76 that has a upper face. Picker members 46 and 48 each include high friction peripheral arcuate segments 78 and 80, respectively. High friction segments 78 and 80 each include resilient high friction material that operates to engage the face of the bounding sheet 76 for purposes of engaging and moving the sheet from the stack. Further, in the example arrangement, the high friction arcuate segments 78 and 80 extend slightly further radially outward beyond an outer surface 82 of the central member 50. The configuration of the high friction arcuate segments 78, 80 enables the picker members to engage and move the bounding sheet so that it moves rotationally with the picker member. When picking a sheet from the stack, the picker members 46 and 48 are aligned radially on each side of the central member and rotate in the direction of arrow F as show in FIG. 3.

Engagement of the high friction arcuate segments 78 and 80 with the face of bounding sheet 76 pulls bounding sheet 76 intermediate of the high friction arcuate segments and at least one stripper member 84. In the example arrangements, stripper member 84 includes one or more generally disc shape members that do not move as sheets are moved in engaged relation with the high friction arcuate segments in the direction of arrow F. Stripper members 84 are generally configured so that only the one sheet that is directly engaged with the picker members can be moved past the stripper members 84. Generally, all of the other sheets, other than the one sheet whose face is directly engaged with the picker members, are prevented by the stripper member from moving with the picker members. Further, in example arrangements, a fender 86 or other suitable guiding member further assists in holding back at least some of the sheets other than the one that is bounding the stack and configured to be separated by the stack through the rotational movement of the picker members. Of course it should be understood that these approaches are examples, and in other embodiments other approaches may be used.

Figure 5:
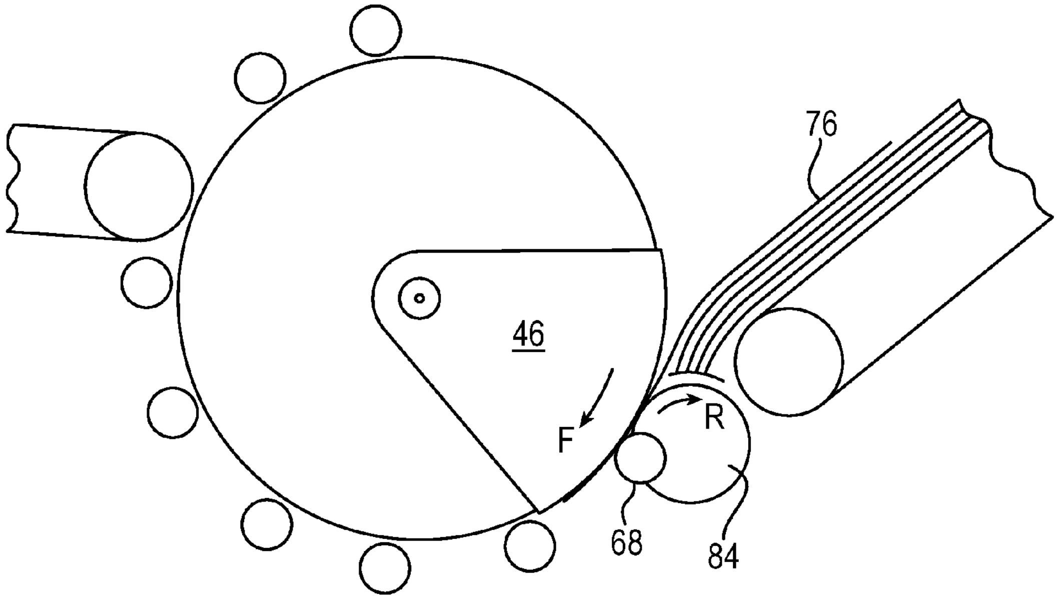

In the example arrangement, movement of the picker members 46 and 48 in the direction of their arrow F cause the sheet 76 bounding the stack to be moved, at least in part, past the stripper members 84. This is represented in FIG. 5. Once the leading edge of the sheet moves past the stripper members, the sheet is sensed through operation of at least one doubles detector 68. The example doubles detector, which is in operative connection with the control circuit, determines if more than just the single sheet bounding the stack has been pulled past the stripper members. In example embodiments, the doubles detector may include a contact type doubles detector, an ultrasonic doubles detector, an optical type doubles detector or other suitable detector for determining sheet thickness.

In most situations, the doubles detector 68 will provide signals that indicate that only a single sheet has been pulled past the stripper members 84 by the picker members 46 and 48. However, in cases where a leading edge of more than one sheet has been moved past the stripper members, the control circuit 60 operates in accordance with its programming to return the multiple sheets to the stack. This is done in the example embodiment by a control circuit 60 operating to reverse the direction of the drive 54 so that the picking members 46, 48 move in a direction opposite to the direction of arrow F. Further, in the example arrangement, the stripper members 84 are connected through a one way clutch or other suitable mechanism that enables the stripper members 46, 48 to freely rotate in a direction opposed of the direction that the stripper members 84 are urged to move during a picking operation. Thus, the stripper members 84 are free to move in the direction of arrow R as shown in FIG. 5. The control circuit 60 operates to reverse the direction of the picker members 46, 48 to return the sheets to the stack. Once the picker members 46, 48 have moved to return the sheets, an attempt may again be made to pick a single sheet by moving the picker members 46, 48 in the direction of arrow F. Generally, this process will cause only one sheet to be moved past the stripper members 84.

In particular embodiments however, some overlapped sheets may prove difficult to separate. When this occurs, the control circuit 60 may operate to separate the sheets by moving the picker members 46, 48 relative to one and another. This may include for example, moving one picker member while the other remains stationary, and then reversing the process. In other arrangements it may include moving the picker members 46, 48 back and forth simultaneously in opposed rotational directions so as to provide a scrubbing process. Relatively moving the picker members 46, 48 causes the sheet bounding the stack and any additional sheets that have their leading edges pulled past the stripper members 84 to separate. This then facilitates the picking of a single sheet. Various types of relative movement of the picking members 46, 48 may be utilized for purposes of separating overlapped sheets. The particular approaches used will depend on the picker mechanism 46,48 and the programming of the control circuit 60. Various types of separating movement speeds and acceleration profiles may be utilized, depending on the nature of the sheets that are being picked.

Figure 6:
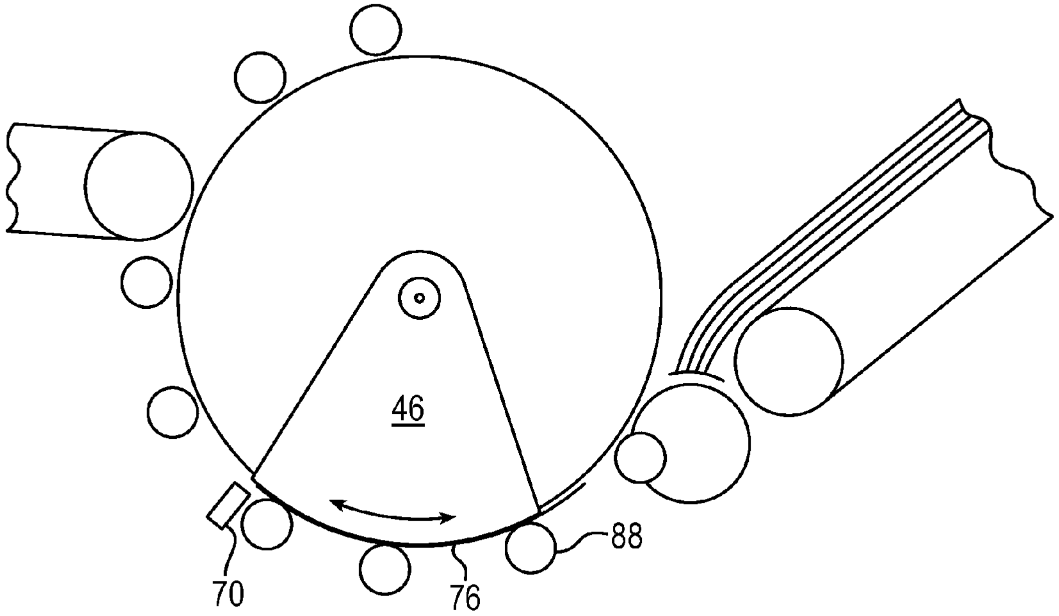

In example embodiments, the picker members 46 and 48 rotate in angularly aligned relation, and the sheets that are picked from the stack move in engaged relation to the picker members 46, 48 such that the leading edge of the sheet is parallel to the axis and generally perpendicular to the direction of sheet travel in which the sheet is being moved. As shown in FIG. 6, in the example embodiment, the sheets move and are held in engagement with the picking members 46, 48 through a plurality of rollers 88. Rollers 88 may, in example embodiments, include cylindrical rollers, ball type rollers or other suitable movable members or combinations thereof that serve to hold the sheet in engagement with the picker members 46, 48 and/or the central member 52, and also enable movement of the sheet as desired in engagement with the picker members.

Once the separated sheet has been moved from the stack 74 as represented in FIG. 6, skew sensors 70 which are in operative connection with the control circuit 60, sense the position of the edge of the sheet to determine if the sheet is skewed relative to the sheet transport direction. For most sheets, because the picker members 46, 48 move in a radially aligned relation, the sheets are not skewed and no steps to de-skew the sheets are required.

Figure 13:
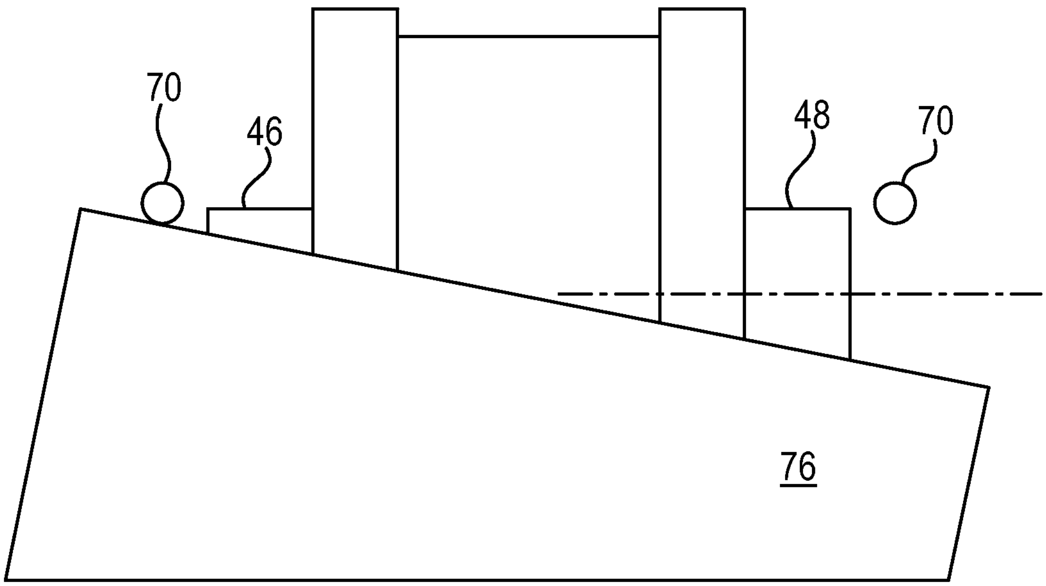
Figure 14:
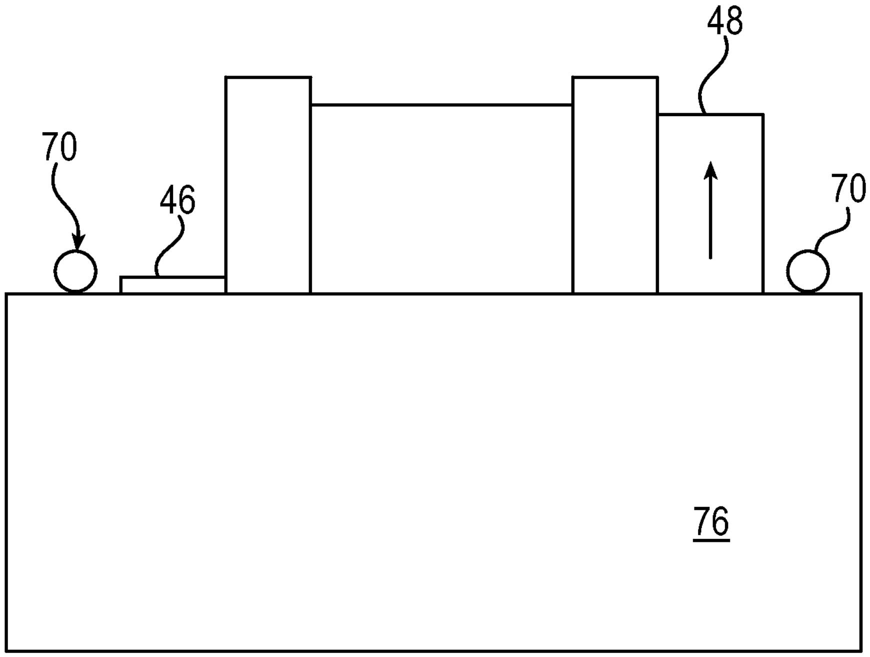

However, in some circumstances a sheet 76 may become skewed relative to the direction of sheet travel as represented in FIG. 13. When this condition occurs, the skew sensors 70, which sense the leading edge of the sheet, enable the control circuit 60 to determine that the sheet is skewed. Upon determining that a skew condition exists, the control circuit 60 operates the at least one drive 54 to de-skew the sheet. This is done by controlling the clutches 56 and 58 in the example arrangement so that one of the picker members 46, 48 moves relative to the other to align the leading edge of the sheet perpendicular with the direction of sheet travel. To accomplish this, the control circuit 60 corrects the skew of the sheet 76 shown in FIG. 13 by causing rotational movement of picker member 48 a greater amount than picker member 46. This is represented in FIG. 14. The relative movement of picker member 48 relative to picker member 46 causes the sheet to be de-skewed. Once the sheet has been aligned relative to the desired direction of travel, the control circuit 60 operates to have the picker members 46, 48 maintain their relative rotational positions during engagement with the sheet so that the sheet continues to move in a proper condition in engagement with the picker members 46, 48. Of course it should be understood that these approaches are examples, and in other arrangements picker 46 could be moved in a reverse direction to de-skew the sheet. Further in alternative arrangements, the speed of the picker members could be varied to achieve de-skewing while the sheet continues to move in the direction of sheet travel. The approaches taken will depend on the particular mechanism and the programming of the control circuit 60.

In the example arrangement, sheets are also generally moved by the picker mechanism in centered relation relative to the sheet path. In the example arrangement the sheet path is generally aligned with the position of the bills as they are engaged with the picker members. Having the sheet generally aligned with the sheet path is also helpful in terms of delivering the sheet accurately to other transports and devices within the machine. Further, having the sheets centered (as well as de-skewed) with the sheet path facilitates delivering the sheets in a controlled manner to analysis devices, such as bill validators or check imaging mechanisms that operate to read and/or analyze data included on sheets. Having the sheets in a desired orientation facilitates the rapid analysis of sheets and reduces errors.

Figure 7:
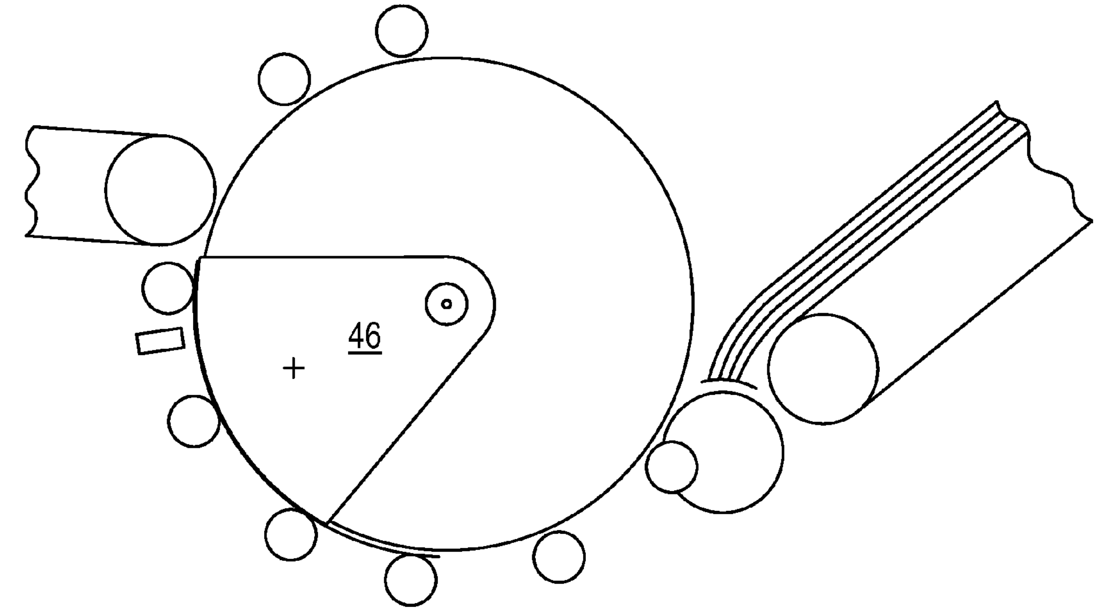
Figure 15:
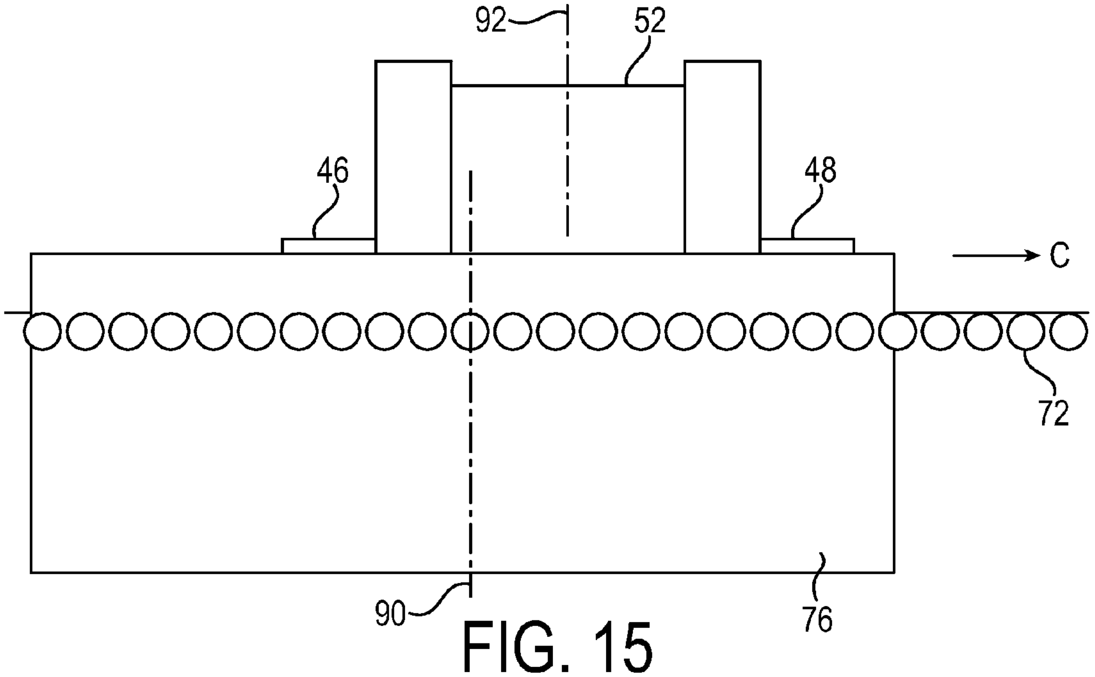

While most sheets generally are centered relative to the sheet stack, for various reasons sheets may not be centered. This is represented in FIGS. 7 and 15. As seen in FIG. 15, sheets such as the example sheet 76 may be transported in the picker such that the sheet centerline 90 is disposed in the axial direction from the centerline of the sheet path 92. The condition of the sheet may be detected by one or more centering sensors 72. Centering sensors 72 of the example embodiment include a linearly aligned plurality of sensors, each of which is in operative connection with the control circuit 60. The control circuit 60 is able to determine from the centering sensors 72 whether or not the sheet is centered with regard to the sheet path.

Figure 16:
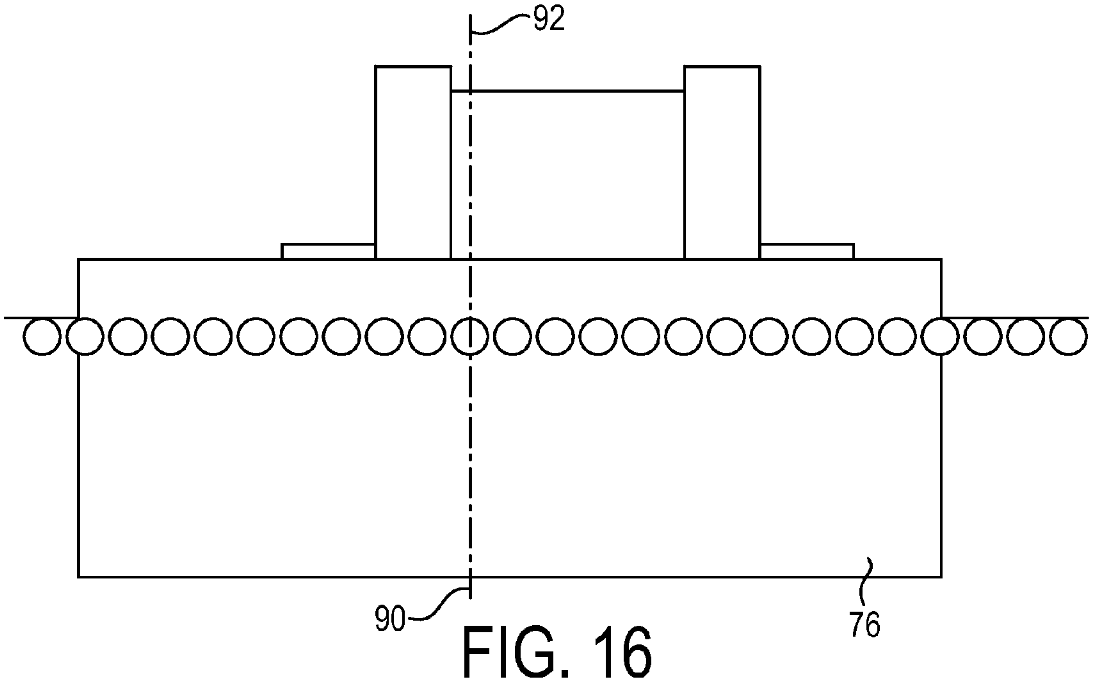

Responsive to this determination, the example control circuit 60 operates to cause drive 64 to move picker members 46 and 48 and the central member 52 in the axial direction along axis 50. For the condition shown in FIG. 15, drive 64 operates to move the members and the sheet in engagement therewith in the direction of arrow C. The at least one drive 64 operates to move the members and the sheet until the sheet centerline 90 corresponds to the centerline of the sheet path 92. This is represented in FIG. 16.

Of course it should be understood that drive 64 and the control circuit 60 may operate to move the picker members 46, 48 and the center member 50 axially in any direction to align the centerline 90 of the sheet with the sheet path centerline 92. Once the sheet has been centered relative to the sheet path, the picking members 46, 48 will continue rotating to complete the particular cycle. Of course it should be understood that in situations where the picker members 46, 48 are relatively radially moved for purposes of de-skewing or are axially moved for purposes of aligning sheets with the centerline 92, the relative positions of the picker members 46, 48 are maintained only through the particular sheet movement cycle associated with that particular sheet. Before the picker members are moved to engage another sheet, the picker members 46, 48 and the central member 50 are moved to their normal operating position. Thus, when a next sheet is picked from the stack, the picker members 46, 48 are positioned to engage the sheet in generally centered relation. In situations where a sheet is not skewed and is aligned with the sheet path, the example picker member operates to continue to move the sheet so that it can then be processed through devices included in the machine. When this is to be done, the sheet 76 is diverted from engagement with the picker members 46, 48 so that it can be engaged by a sheet transport 94 that can move the sheet to an appropriate sheet processing device. This may include for example, a check imager, a bill validator or other suitable sheet handling device.

Figure 8:
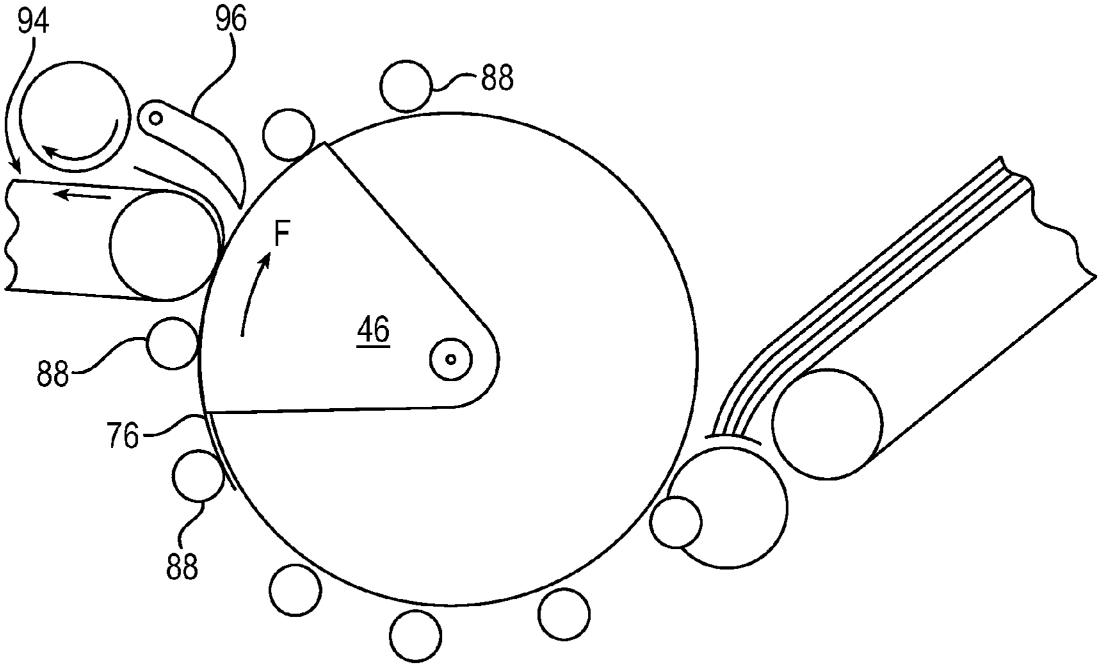

In order to engage the sheet with the sheet transport 94, and to disengage the sheet from the picker members, a diverter 96 is moved responsive to the control circuit 60 to the position shown in FIG. 8. The diverter 96 is moved responsive to one or more drives to a position in which the leading edge of the diverter contacts the sheet 76 and directs it to engage the sheet transport 94. As can be appreciated, rotation of the picker members in the direction of arrow F facilitate the movement of the sheet to disengage the picker members and to be moved by the sheet transport in the machine to a suitable sheet processing device.

Figure 9:
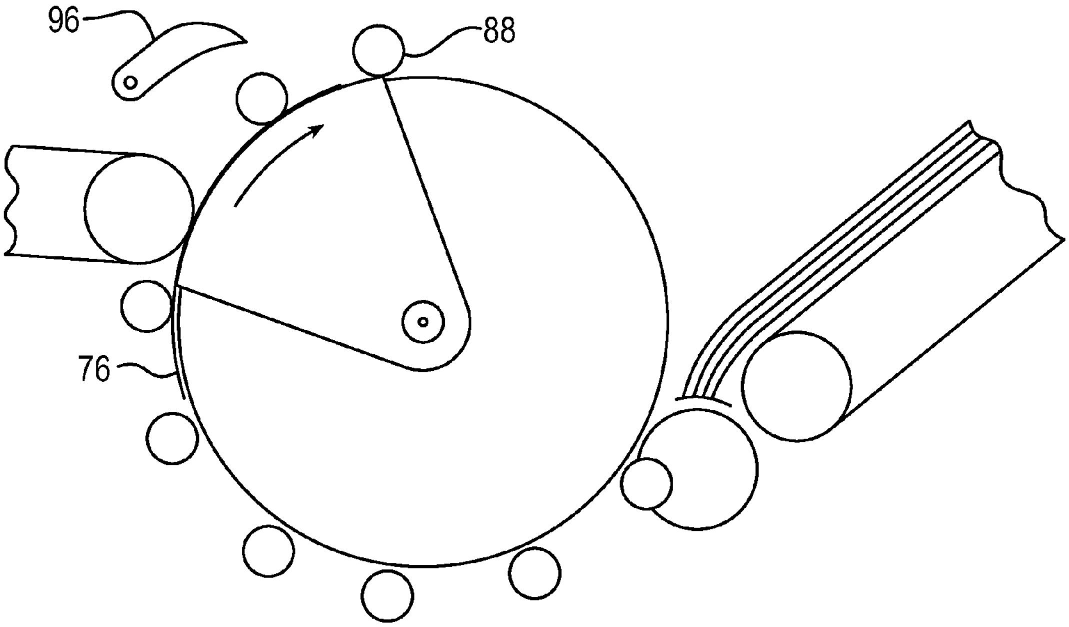
Figure 10:
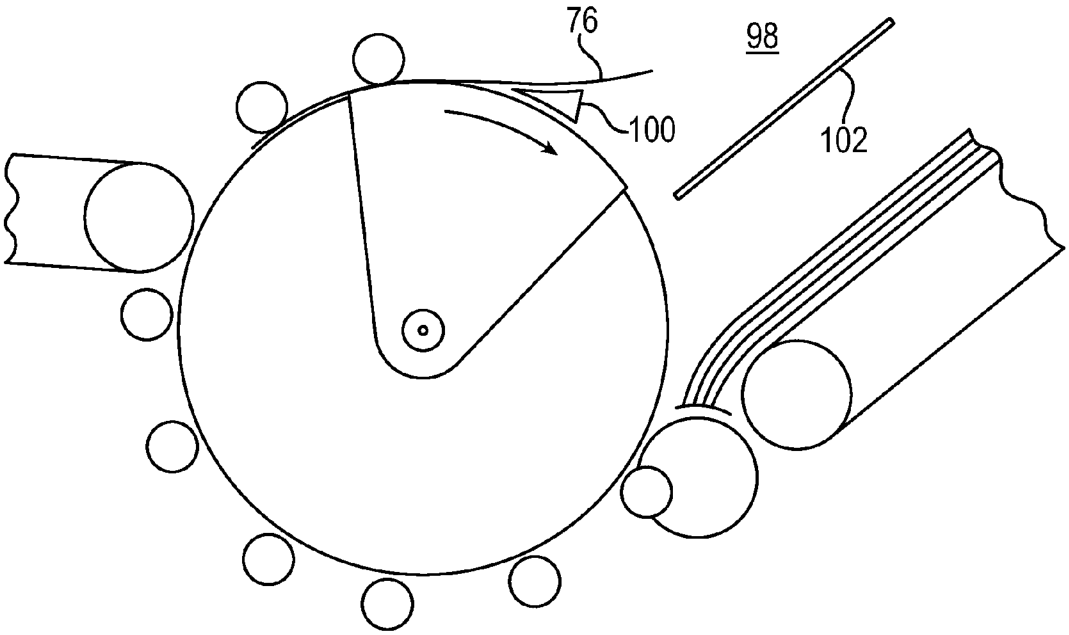
Figure 11:
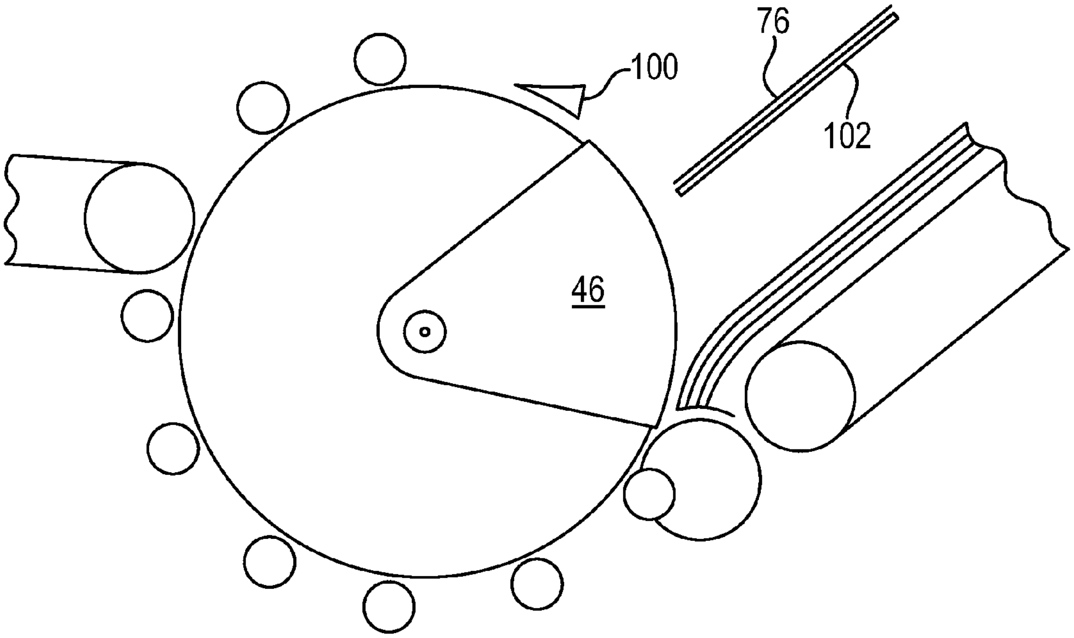

Alternatively as represented in FIG. 9, in circumstances where the sheet 76 could not be de-skewed, double sheets could not be separated or the sheet could not be centered or otherwise handled, the sheet may be moved to place it in a storage area. In these circumstances, the control circuit 60 operates to position the diverter 96 so that the sheet is not separated from the picker members 46, 48. In these circumstances, the sheet 76 is carried in engagement with the picker members 46, 48 and the rollers 88 toward a storage area 98 as shown in FIG. 10. In the example arrangement, the sheet is separated from engagement with the picker members 46, 489 by a suitable separating member 100. The separating member 100 engages the sheet 76 and causes the sheet 76 to disengage from the picker members 46, 48. The sheet 76 is directed into the storage area in which it is supported on a support plate 102 as represented in FIG. 11. In the example arrangement, support plate 102 may be a movable plate such as those shown in the incorporated disclosure, which provides for the capability of presenting sheets to machine users through the machine access area. Of course it should be understood that these approaches are just examples, and in other embodiments other approaches may be used.

Figure 12:
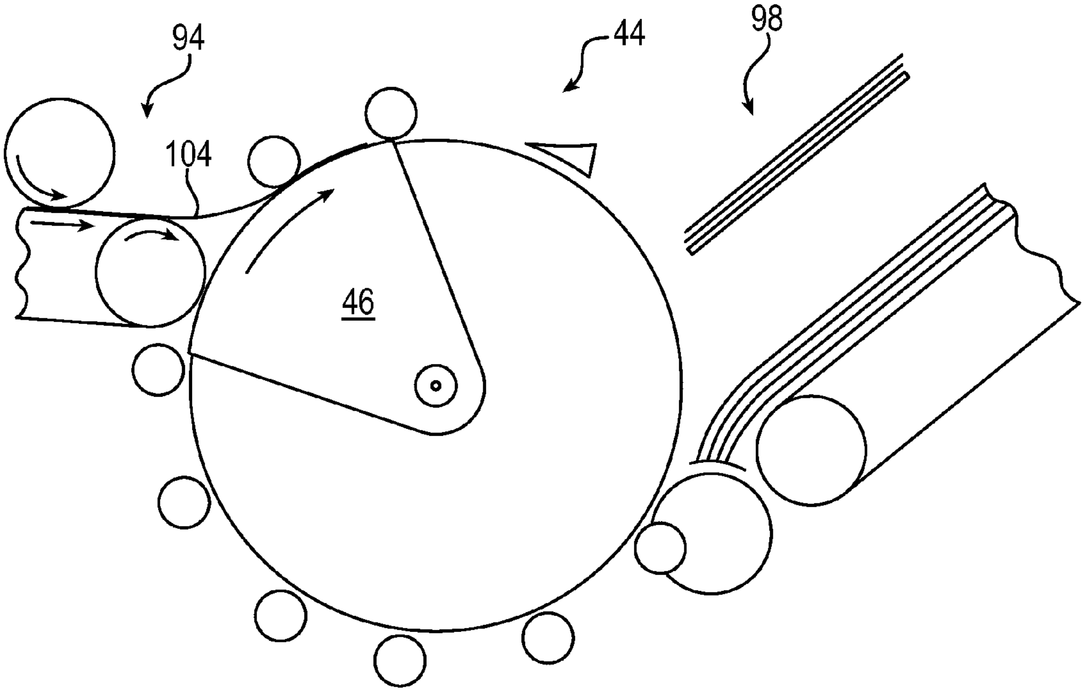

The completion of a rotation of the picking members 46, 48 then places the picker 44 in condition to engage another sheet in the stack and separate it from the stack for purposes of processing the sheet. Of course as previously discussed, before engaging another sheet, the control circuit 60 operates to return the picking members 46, 48 and the central member 50 to the radially aligned condition and also in centered relation relative to the sheet path. As represented in FIG. 12, the example picker mechanism also provides the capability of using the picker member 46 to receive sheets from the sheet transport 94. An incoming sheet 104 delivered through the transport will 94 engage the picker members 46 and 48. The rotating picker members 46, 48 may then move the sheet 104 so that it is deposited in the storage area 98. This enables the example picker member 46 to receive sheets that have been processed by the machine, such as checks, currency bills or other sheet items, and to place them in a storage area, including storage areas that may be included in a customer access area from which the sheets may be removed. Of course it should be understood that this approach is just an example, and in other embodiments other approaches may be used.

FIGS. 17 through 20 show an example embodiment of chest portion 106 of an automated banking machine housing. The chest portion 106 is shown schematically as a cut away view to disclose the sheet handling mechanisms and sheet transport mechanisms therein. The chest portion 106 includes a plurality of sheet dispenser mechanisms 108, 110, 112 and 114. The sheet dispenser mechanisms 108, 110, 112, 114 include an associated picker mechanism, for example picker 116. The picker mechanism may be of the type similar to picker 44 previously described. Alternatively, in other arrangements, the picker mechanism may be of the types described in U.S. Pat. Nos. 6,634,636 and/or 6,629,694, the disclosure of each of which is incorporated herein by reference in its entirety.

The sheet dispenser mechanisms 108, 110, 112, 114 also includes a removable sheet holding cassette, for example cassette 118. Each cassette holds sheets in stacked relation that can be removed therefrom one at a time by the associated picker mechanism 116. In the example arrangement, each of the cassettes associated with the sheet dispensing mechanisms is removable from operative engagement with the picker mechanism. The cassettes can be removed from engagement with the picker mechanisms by opening a door 120, which closes an opening in a side of the chest. As can be appreciated, door 120 may be held closed through a secure boltwork and locking mechanism which can be opened only by authorized persons. Such a chest door and secure locking mechanism may be of the type shown in U.S. Pat. No. 5,970,890, the disclosure of which is incorporated herein by reference in its entirety. Of course this structure is example, and in other example arrangements other structures may be used.

The example chest portion 106 further includes recycling mechanisms 122 and 124. Recycling mechanisms 122 and 124 are a type that are capable of receiving sheets for storage therein, as well as dispensing sheets therefrom. The recycling mechanisms may be of the type shown in U.S. Pat. Nos. 6,302,393 or 6,331,000, the disclosure of each of which is incorporated herein by reference in its entirety. Alternatively, the recycling mechanisms may be of a type shown in U.S. Pat. No. 6,170,818, the disclosure of which is also incorporated herein by reference in its entirety.

Each recycling mechanism includes a removable sheet storage cassette, for example 126. Like the dispenser cassettes, each of the recycling cassettes is made to be removable from the machine. Further, in some example arrangements the cassettes may be like that described in U.S. patent application Ser. No. 13/765,415, filed Feb. 12, 2013, the disclosure of which is incorporated herein by reference in its entirety. As discussed in the incorporated disclosure, the automated banking machine may be structured so that select cassettes are used to store sheets that are to be removed from the machine, and may house for example currency notes of a particular type that are not expected to be needed in the course of machine operation. Alternatively, this may include checks or other documents that have been received. Further, as explained in the incorporated disclosure, certain cassettes may also be used to deliver sheets needed to replenish the machine. The sheets in such cassette may be removed therefrom and placed in other storage areas or cassettes within the machine so as to provide sheets that can be used in machine operation. Of course is should be appreciated that these approaches are example, and in other embodiments other arrangement may be used.

Figure 23:
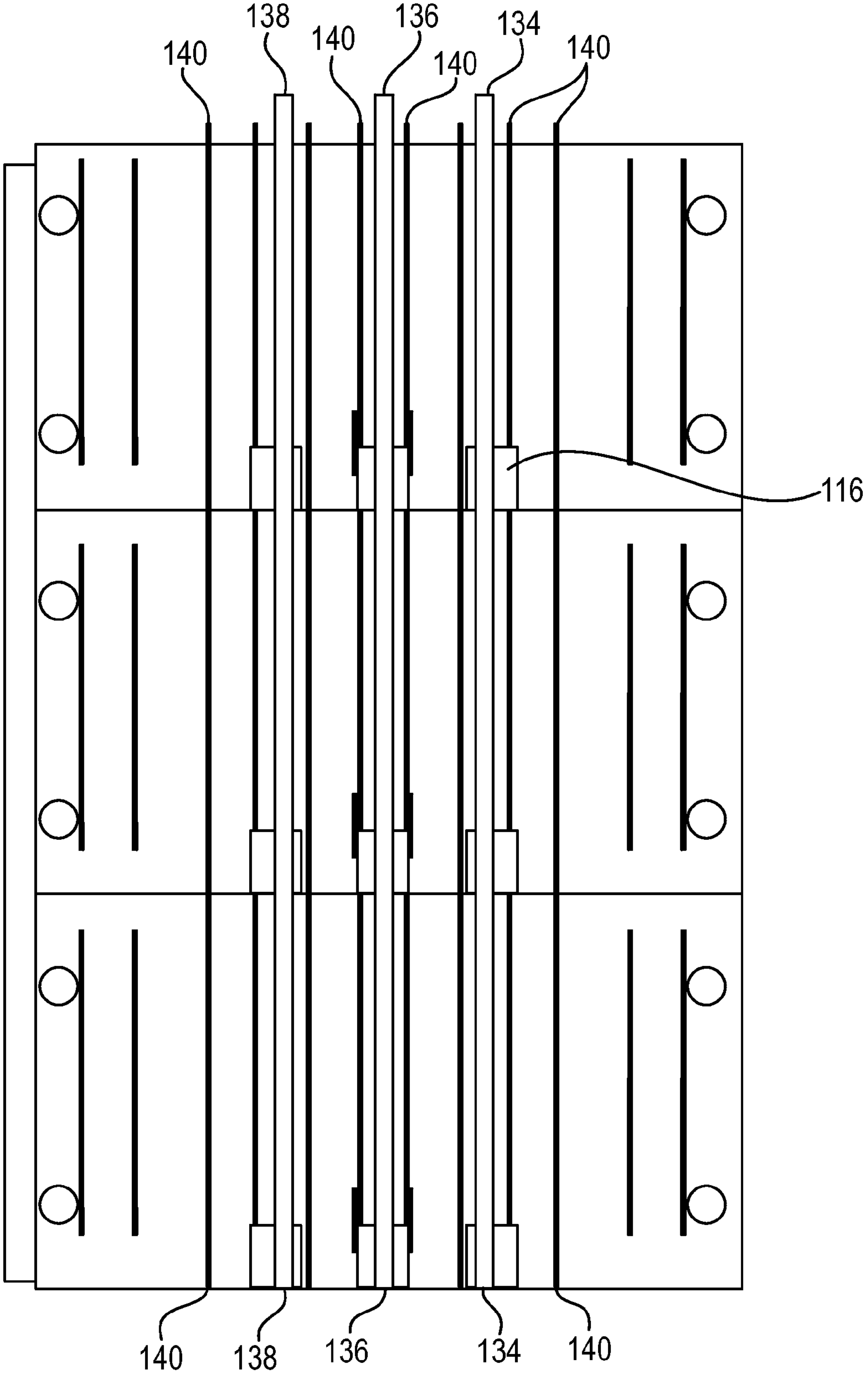
Figure 24:
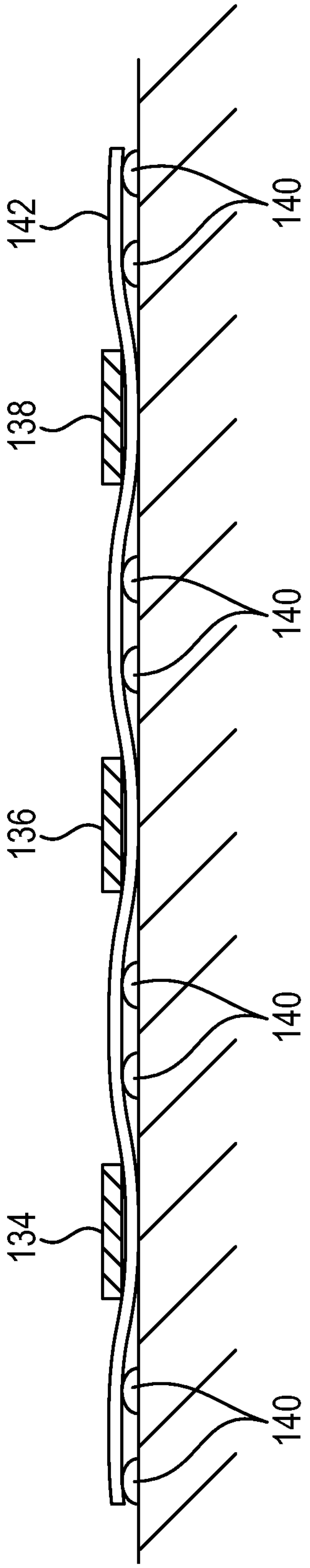

The example chest portion also includes a plurality of sheet transports generally indicated 128. In the example arrangement, sheet transports include a first lower transport 130 and an upper sheet transport 132. In the example arrangement, sheet transports 130 and 132 include a plurality of disposed belt flights with opposed projections extending there between. An example transport of this configuration is shown in FIGS. 23 and 24. This example transport includes three belt flights 134, 136 and 138. Disposed between the belt flights are opposed projections 140. As represented in FIG. 24, a sheet 142 may be moved in engaged relation between the belt flights and the projections. In this way, the sheet can be moved to desired locations and transferred as desired within the machine. Further, as can be appreciated from FIG. 23, sheets that are dispensed from a picker or recycling mechanism such as picker 116 are delivered into engagement with the belt flights and can be carried from the point where the sheets are delivered by the picker mechanism in engagement between the belt flights and the projections. This is represented by the sheet 144 shown in FIG. 17 being dispensed by a picker associated with the sheet dispensing mechanism 114 and moved in engagement with the belt flights of lower transport 130 that is adjacent to the sheet opening from the picker mechanism.

In an automated banking machine using the example chest portion 106, sheets are moved to and from the chest portion so that sheets can be processed by sheet handling mechanisms included in the housing of the automated banking machine located in the housing above the chest portion. Such sheet processing mechanisms may include bill validation mechanisms, check imaging and processing mechanisms, or other sheet handling mechanisms. Such mechanisms are discussed in detail in the incorporated disclosures. Such sheets are passed to the interior of chest portion 106 through an opening 146 that extends in a top wall 148 of the chest portion. As can be appreciated, sheets may be passed into and out of the opening 146 using transports such as the transport schematically represented 150.

The example chest portion and the associated transports provide the capabilities of having a chest portion with a relatively small opening that can transport sheets into and out of the interior of the chest. Further, in the example arrangements, sheets may pass into and out of the chest opening simultaneously. The capability to have a generally small chest opening reduces the risk of attacks through the chest opening to access the currency notes or other valuable sheets stored within the chest portion. Further, the capabilities to move sheets simultaneously into and out of the chest can provide faster sheet processing, as well as more varied configurations for sheet handling mechanisms within the automated banking machine.

Figure 17:
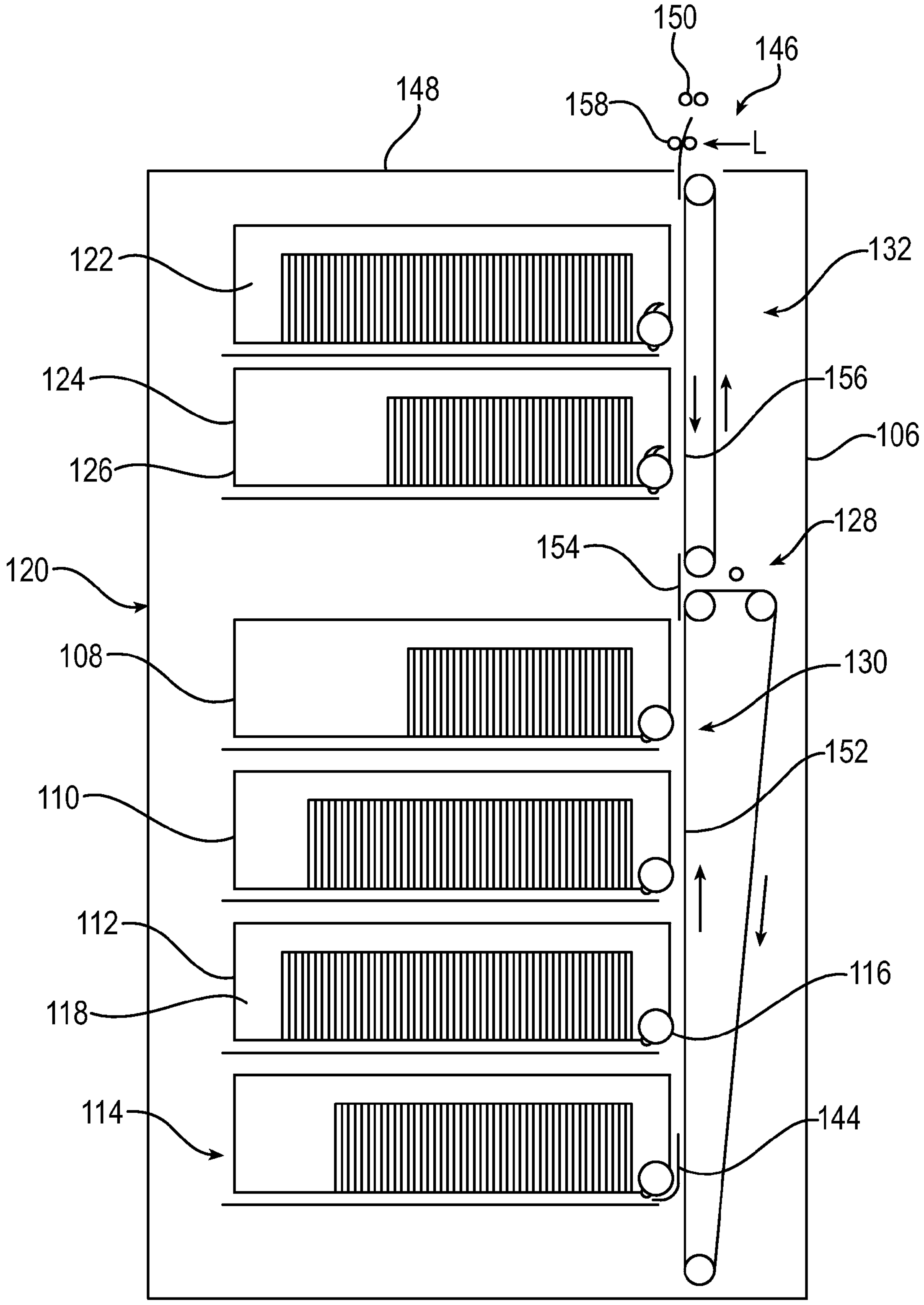
FIGS. 17 through 20 are schematic views of a chest portion of an automated banking machine and a sheet transport mechanism used in connection with accepting and dispensing sheets.

FIG. 17 shows schematically the delivery of sheets out of the opening 146 in the chest portion. As previously mentioned, sheets such as sheet 144 are delivered from sheet dispensing mechanism 114 and moved in engagement with belt flights 152 of the lower transport. The sheet is carried by a sheet directing mechanism 154 to engage belt flights 156 of the upper transport mechanism 132 as the sheet disengages from belt flights 152. The sheet 144 then passes upward through the opening 146 to engage the transport 150 in the upper housing portion. In this example arrangement, a sheet guide schematically represented 158 is disposed in the position represented by arrow L to engage the sheet and direct it to the transport. As can be appreciated, the dispensing of sheets as shown in FIG. 17 would be applicable to sheets dispensed by any of the sheet dispensing mechanisms 108, 110, 112 and 114.

Figure 18:
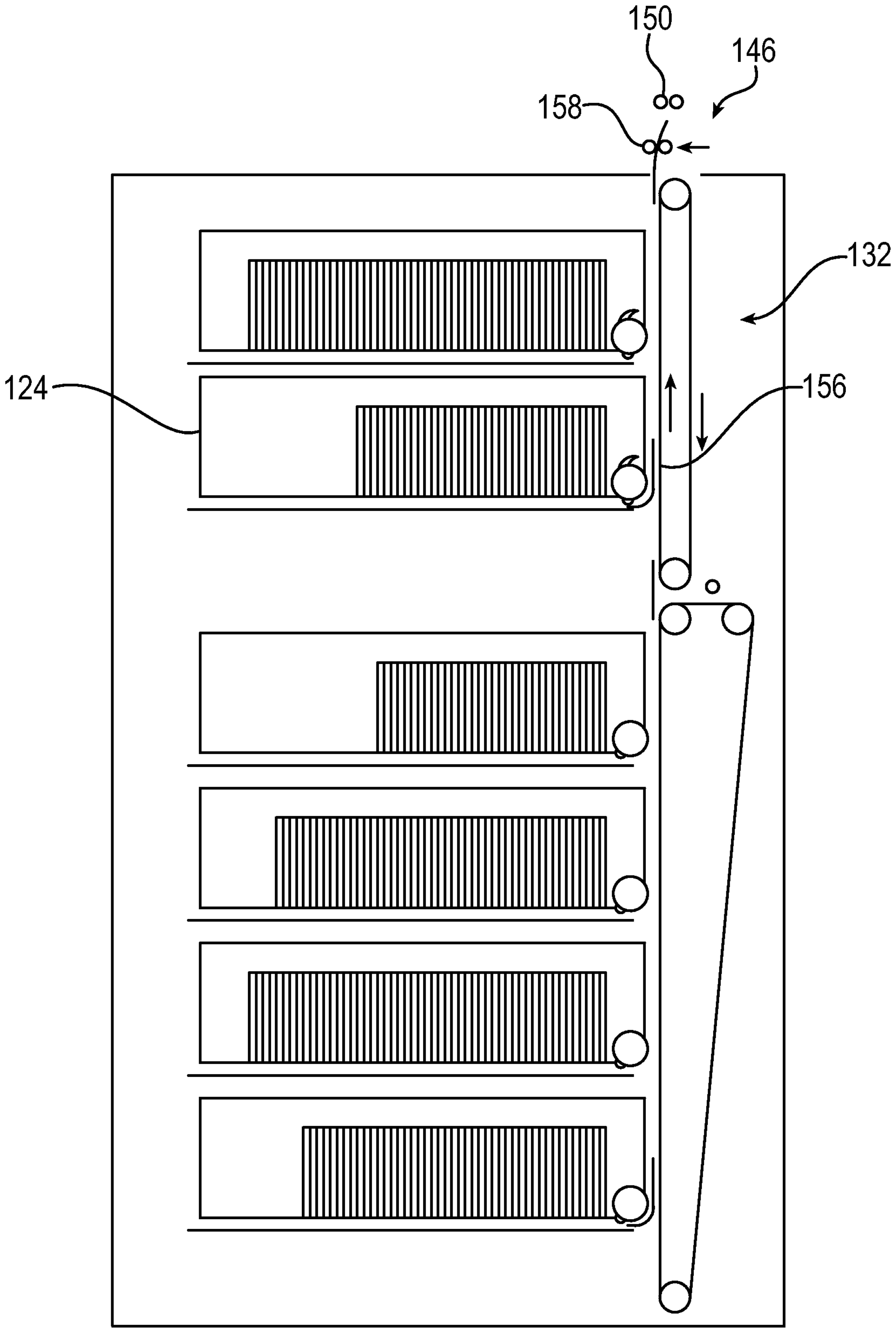

FIG. 18 shows the transport of a sheet from one of the recycling mechanisms. In this example, a sheet 158 is dispensed from recycling mechanism 124. The sheet is carried in engagement with flights 156 of upper transport 132. The sheet is then moved out of the opening 146 and engaged by sheet guide 158 and is directed into engagement with transport 150.

Figure 19:
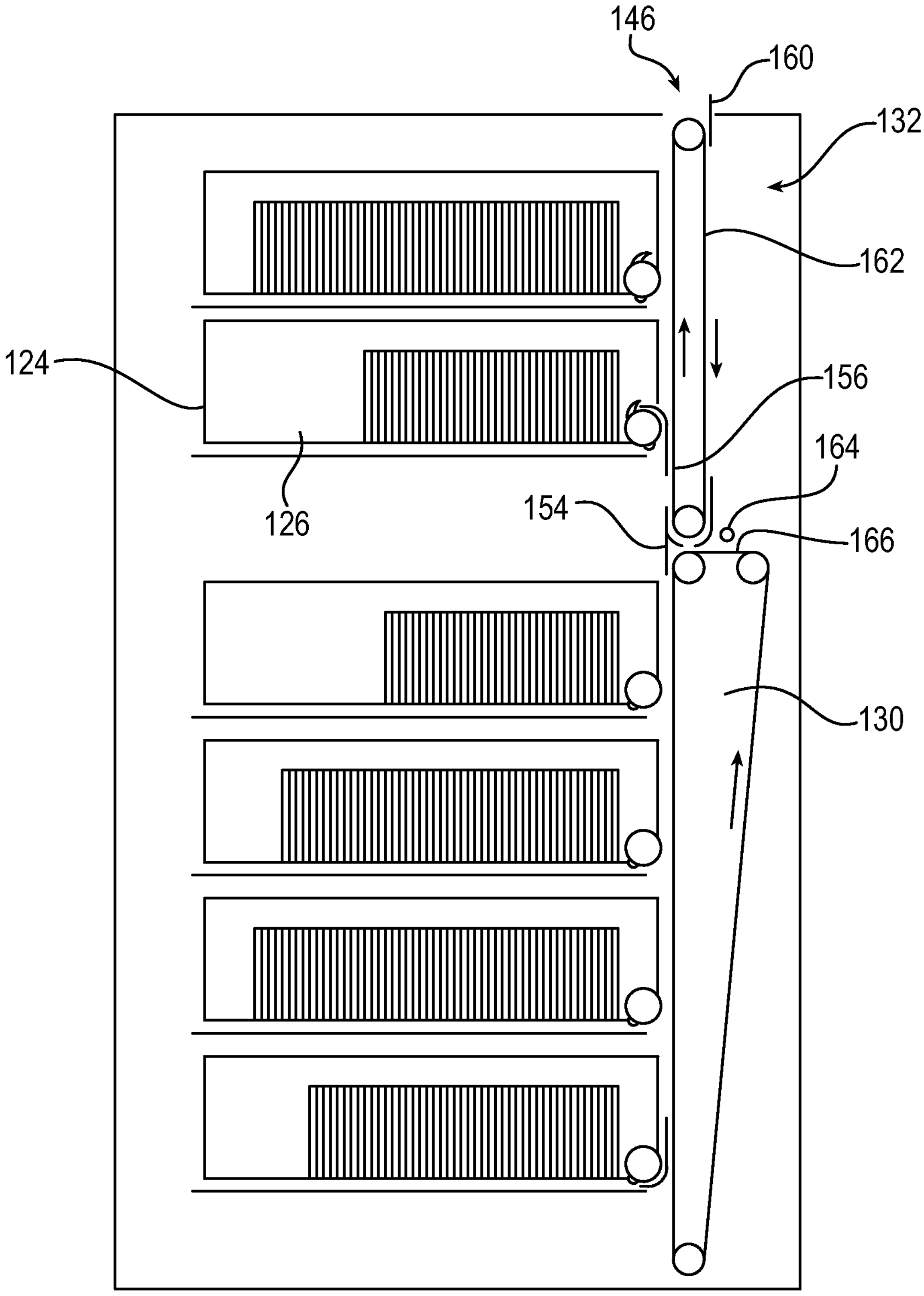

FIG. 19 shows an example arrangement where sheets are received through the opening of the chest portion and stored in recycling mechanism 124. In this example arrangement, sheets such as sheet 160 moves inward through opening 146 and is engaged by belt flights 162 of upper transport 132. The example arrangement belt flights 162 are similar to the belt flights previously described, which include belt flights and adjacent longitudinal projections which serve to enable sheets to be carried in engagement with the belt flights.

In this configuration, the sheet 160 is directed by rollers 164 and belt flights 166 of lower transport 130 to move inward to engage the sheet directing mechanism 154. The sheet directing mechanism is configured in this operation in the manner shown so as to direct the sheet upward in engagement with belt flights 156. The upward moving sheet is then engaged by the rotating member of the recycler mechanism 124, which operates to store the sheet within the cassette 126 thereof. As can be appreciated, this particular configuration enables the use of recycler mechanisms that operate to receive sheets that are moving in the adjacent transport in the same direction that sheets are moved when sheets are dispensed from the recycler mechanisms. This approach can provide flexibility with regard to the type of mechanisms that may be utilized.

Figure 20:
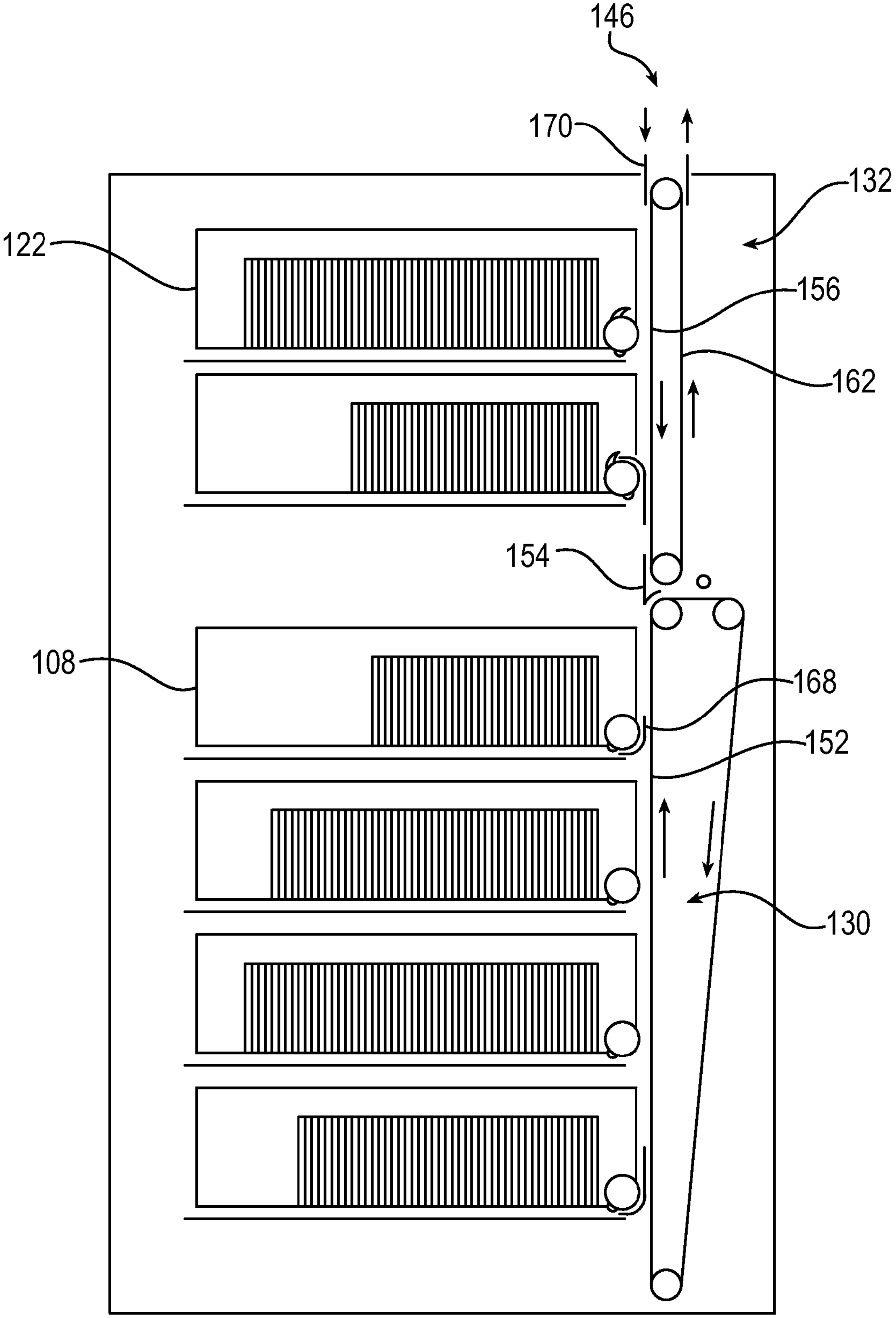

FIG. 20 discloses a configuration in which sheets are both dispensed through the opening 146 and received in the opening 146, generally simultaneously. In this example arrangement, a sheet 168 is dispensed from sheet dispensing mechanism 108. Sheet 168 engages belt flights 152 of the lower transport mechanism 130. Sheet 168 engages sheet directing mechanism 154, which in this configuration operates to direct sheet 168 to be shifted so as to engage belt flights 162. The sheet is carried in engagement with belt flights 162 outward through the opening 146.

Further in the configuration shown in FIG. 20, a sheet 170 is directed inwardly through the opening 146. Sheet 170 is moved downward in engagement with belt flights 156 of the upper transport mechanism 132. The sheet 170 moves downward until it is engaged by a rotating member of the sheet recycling mechanism 122. The sheet 170 is then stored in the recycling mechanism.

As can be appreciated in this example arrangement, the sheet recycling mechanism is capable of receiving downwardly moving sheets and moving them into stored relation within the cassette associated with recycling mechanism 122. The example configuration of the sheet handling mechanisms and the chest enable mechanisms positioned outside the chest to operate so that sheets are both received from and delivered to the opening 146 of the chest during operation of the machine. This is useful in speeding the carrying out of transactions in some example arrangements. Further it should be appreciated that the transports, recycling mechanisms, sheet directing mechanisms and picker mechanisms are all associated with drive mechanisms such as motors, solenoids and other suitable movement devices that operate under the control of control circuit and/or the computer of the automated banking machine. Further, example arrangements include sensors, detectors, and other suitable devices in operative connection with control circuit so as to provide the controlled movement of sheets in coordinated relation as desired for purposes of carrying out the desired sheet movement for the transactions that are conducted through operation of the machine. Further it should be appreciated that the sheet handling mechanisms shown are example, and in other arrangements different or other types of sheet handling mechanisms may be used.

Figure 21:
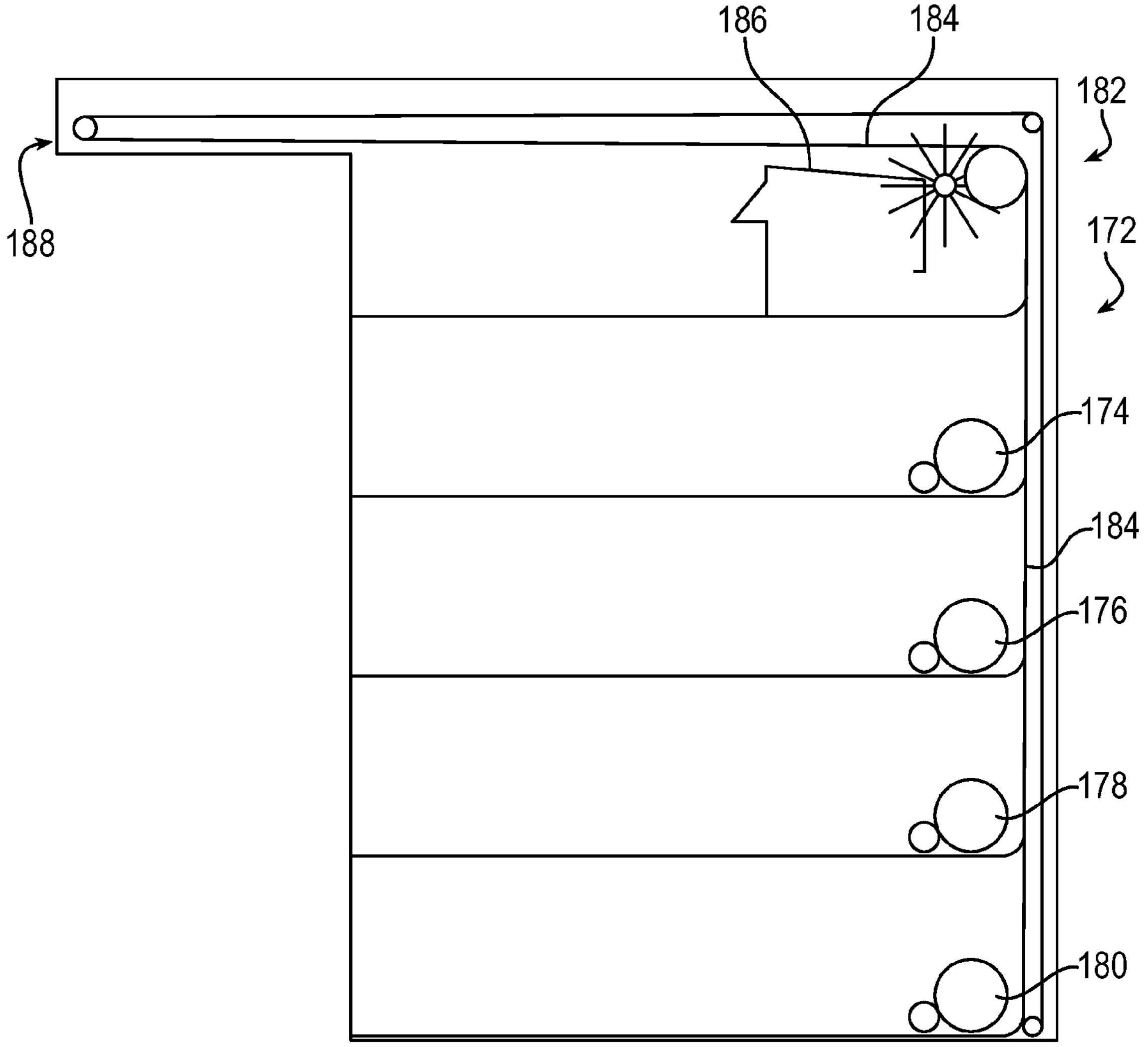
FIGS. 21 through 24 are schematic views of a sheet dispenser mechanism that is used for dispensing a stack of sheets such as currency notes.
Figure 22:
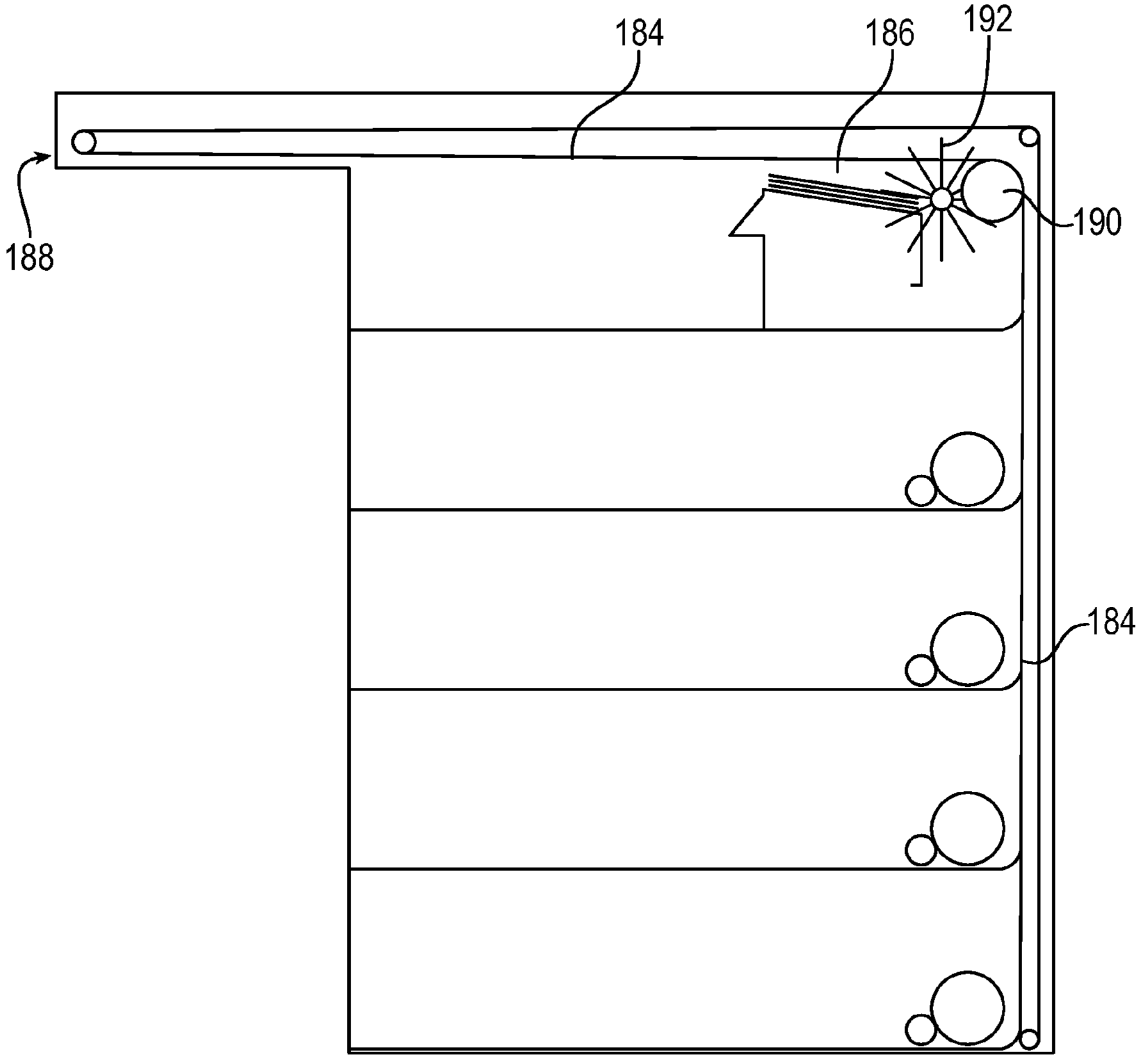

FIGS. 21 and 22 show an example arrangement of a sheet dispenser 172 that may be used in example embodiments of an automated banking machine. This example sheet dispenser mechanism may be used in a machine where the machine operates to provide only sheet dispensing transactions such as cash dispensing, and not check or bill accepting. The example sheet dispenser includes a plurality of pickers 174, 176, 178 and 180. The pickers may include features like those described in connection with picker 44. Alternatively, the pickers may be of other types such as those shown in U.S. Pat. Nos. 6,634,636 and/or 6,629,694, the disclosures of each of which are incorporated herein by reference in their entirety.

As can be appreciated, each of the pickers is associated with a stack of sheets such as currency notes, which are held in removable cassettes and which can be delivered one at a time from the picker mechanism into engagement with a sheet transport generally indicated 182. In the example arrangement, the transport 182 includes a plurality of parallel continuous belt flights 184 that extend from adjacent the sheet outlet opening of picker 180 through a stacker area 186 and to the sheet outlet opening 188. As can be appreciated, the sheet outlet opening corresponds to the user accessible opening 122 of the example automated banking machine 10. In the example embodiment, sheets that are picked by an of pickers 174, 176, 178 and 180 move into engagement with the vertically extending portion of belt flights 184. The sheets move individually and are carried in engagement with the belt flights about a large cylindrical roller 190. Through engagement with the cylindrical roller, the sheets are turned so that they move in a horizontal direction in engagement with the horizontally extending portion of belt flights 184. In the example arrangement, the sheets that are to be dispensed are arranged in a stacker area 186 into a stack. This is accomplished by lowering a plate bounding the stacker area and directing sheets therein via flexible arms of a rotating paddle-wheel 192.

When the desired number and types of sheets for dispense have been accumulated in the stacking area, the support plate bounding the lower end of the stack of sheets is moved upward so that the sheet stack is engaged with the horizontally extending portion of belt flight 184. The sheet stack is then carried to the opening 188. In the example arrangement, a gate positioned adjacent to the opening 188 is opened prior to arrival of the sheet stack so that the stack may be extended therefrom.

In this example arrangement, the use of continuous elongated belts, and particularly continuous belt flights 184 that engage and move the sheets from the time that they are picked by the pickers until they are presented through the outlet opening, serve to reduce the probability of sheet jams. This occurs because the sheets do not have to be transferred between different transports as they move within the sheet dispenser mechanism. This arrangement also reduces complexity and cost. The example arrangement may also provide enhanced reliability by reducing the number of belts and other items associated with the transport that have the possibility of failure. Of course it should be appreciated that while this particular approach is shown in connection with a sheet dispenser mechanism, similar approaches may be taken in connection with mechanisms that provide for bill acceptance and check acceptance, as well as bill recycling.

Thus, the example embodiments achieve at least some of the above stated objectives, eliminate difficulties encountered in the use of prior devices and systems, and attain the useful results described herein.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

What is claimed:

1. An apparatus, comprising:

a picker that is operable to separate an individual sheet from a stack of sheets, the picker comprises:

a first rotatable picker member that includes a first high friction peripheral arcuate segment, where the first picker member is rotatable about an axis, a second rotatable picker member that includes a second high friction peripheral arcuate segment, wherein the second picker member is rotatable about the axis, wherein the stack includes a bounding sheet having a sheet face bounding a side of the stack, wherein the first and second arcuate segments are operable to concurrently engage the sheet face, a drive in operative connection with the first and second rotatable picker members, a stripper member that is configured generally to prevent sheets other than the bonding sheet from being separated from the stack by rotation of the first and second picker members in a first rotational direction, wherein the first and second picker members are operable to be separately rotationally movable about the axis responsive to operation of the drive;

a control circuit operatively coupled with the drive; and a doubles detector operatively coupled with the control circuit;

wherein the doubles detector is operable to detect a doubles condition where at least one other sheet in addition to the bounding sheet has moved past the stripper member;

wherein the control circuit is responsive to the doubles detector detecting a condition where at least one other sheet in addition to the bounding sheet has moved past the stripper to move the first and second picker members in a second rotational direction that is opposite of the first rotational direction, whereby the bounding sheet and the at least one additional sheet are returned to the stack;

wherein responsive at least in part to the determination of a doubles condition, the control circuit is operable to cause the first picker member to rotationally move relative to the second picker member; and wherein the bounding sheet and the at least one additional sheet that moved past the stripper member are moved relative to each other.

2. The apparatus set forth in claim 1, further comprising:

a sheet skew sensor; and a control circuit operatively coupled with the drive and the sheet skew sensor;

wherein the sheet skew sensor is operative to sense skew of the bounding sheet separated from the stack relative to a direction of sheet travel;

wherein the direction of sheet travel is generally parallel to a direction of movement of the first and second arcuate segments;

wherein the control circuit is configured to operate responsive at least in part to the skew determination to cause relative rotational movement of the first and second picker members; and wherein the relative rotational movement of the first and second picker members causes the sheet to be aligned with the direction of sheet travel.

3. The apparatus set forth in claim 1, further comprising:

a diverter;

a control circuit operatively coupled with the drive and the diverter;

wherein the control circuit selectively operates the diverter to cause the bounding sheet that has been separated from the stack to engage a sheet transport; and wherein the separated bounding sheet is moved from engagement with the first and second picker members by the sheet transport.

4. The apparatus set forth in claim 3, wherein the diverter directs the bounding sheet to a storage area.

5. An apparatus, comprising:

a picker that is operable to separate an individual sheet from a stack of sheets, the picker comprises:

a first rotatable picker member that includes a first high friction peripheral arcuate segment, where the first picker member is rotatable about an axis, a second rotatable picker member that includes a second high friction peripheral arcuate segment, wherein the second picker member is rotatable about the axis, wherein the stack includes a bounding sheet having a sheet face bounding a side of the stack, wherein the first and second arcuate segments are operable to concurrently engage the sheet face, a drive in operative connection with the first and second rotatable picker members, a stripper member that is configured generally to prevent sheets other than the bonding sheet from being separated from the stack by rotation of the first and second picker members in a first rotational direction, wherein the first and second picker members are operable to be separately rotationally movable about the axis responsive to operation of the drive;

a centering sensor;

a control circuit operatively coupled with the drive and the centering sensor;

wherein the at least one centering sensor is configured to sense a position of a bounding sheet separated from the sheet stack relative to a center of a sheet path; and wherein the control circuit is operable to cause the drive to move the first and second picker members in an axial direction to move the sheet in engagement with the first and second picker members to be centered relative to the sheet path responsive to the centering sensor sensing that the separated bounding sheet is not centered with the sheet path.

6. An apparatus, comprising a picker that is operable to separate an individual sheet from a stack of sheets, the picker comprises:

a first rotatable picker member that includes a first high friction peripheral arcuate segment, where the first picker member is rotatable about an axis, a second rotatable picker member that includes a second high friction peripheral arcuate segment, wherein the second picker member is rotatable about the axis, wherein the stack includes a bounding sheet having a sheet face bounding a side of the stack, wherein the first and second arcuate segments are operable to concurrently engage the sheet face, a drive in operative connection with the first and second rotatable picker members, a stripper member that is configured generally to prevent sheets other than the bonding sheet from being separated from the stack by rotation of the first and second picker members in a first rotational direction, wherein the first and second picker members are operable to be separately rotationally movable about the axis responsive to operation of the drive; and a center member that is axially disposed intermediate of the first and second picker members;

wherein the center member is rotationally stationary relative to the first and second picker members.

7. The apparatus set forth in claim 6, further comprising:

a second drive operatively coupled with the center member;

wherein the second drive is operable to cause the center member to be axially movable.

8. An apparatus, comprising:

an automated banking machine that operates responsive at least in part to data read from data bearing records, wherein the machine includes:

a housing, an input device supported by the housing, wherein the input device is operative to receive inputs from users of the automated banking machine, wherein the input device includes a card reader that is operative to read data from user cards, wherein read data from user cards is usable to identify a financial account, an output device operable to provide outputs, a processor associated with the automated banking machine that is operatively coupled with the input device and output device, wherein the processor is operative to cause a determination to be made that card data read from a user card through operation of the card reader corresponds to a financial account on which a transaction is authorized to be conducted through operation of the machine, and a financial transfer involving the financial account responsive at least in part to the determination, and a picker that is operable to separate an individual sheet from a stack of sheets in response to instructions received from the processor, the picker comprises:

a first rotatable picker member that includes a first high friction peripheral arcuate segment, where the first picker member is rotatable about an axis, a second rotatable picker member that includes a second high friction peripheral arcuate segment, wherein the second picker member is rotatable about the axis, wherein the stack includes a bounding sheet having a sheet face bounding a side of the stack, wherein the first and second arcuate segments are operable to concurrently engage the sheet face, a drive in operative connection with the first and second rotatable picker members, a stripper member that is configured generally to prevent sheets other than the bonding sheet from being separated from the stack by rotation of the first and second picker members in a first rotational direction, wherein the first and second picker members are operable to be separately rotationally movable about the axis responsive to operation of the drive;

a control circuit operatively coupled with the drive; and a doubles detector operatively coupled with the control circuit;

wherein the doubles detector is operable to detect a doubles condition where at least one other sheet in addition to the bounding sheet has moved past the stripper member;

wherein the control circuit is responsive to the doubles detector detecting a condition where at least one other sheet in addition to the bounding sheet has moved past the stripper to move the first and second picker members in a second rotational direction that is opposite of the first rotational direction, whereby the bounding sheet and the at least one additional sheet are returned to the stack;

wherein responsive at least in part to the determination of a doubles condition, the control circuit is operable to cause the first picker member to rotationally move relative to the second picker member; and wherein the bounding sheet and the at least one additional sheet that moved past the stripper member are moved relative to each other.

9. The apparatus set forth in claim 8, the picker further comprising:

a sheet skew sensor; and a control circuit operatively coupled with the drive and the sheet skew sensor;

wherein the sheet skew sensor is operative to sense skew of the bounding sheet separated from the stack relative to a direction of sheet travel;

wherein the direction of sheet travel is generally parallel to a direction of movement of the first and second arcuate segments;

wherein the control circuit is configured to operate responsive at least in part to the skew determination to cause relative rotational movement of the first and second picker members; and wherein the relative rotational movement of the first and second picker members causes the sheet to be aligned with the direction of sheet travel.

10. The apparatus set forth in claim 8, the picker further comprising:

a diverter;

a control circuit operatively coupled with the drive and the diverter;

wherein the control circuit selectively operates the diverter to cause the bounding sheet that has been separated from the stack to engage a sheet transport; and wherein the separated bounding sheet is moved from engagement with the first and second picker members by the sheet transport.

11. The apparatus set forth in claim 10, wherein the diverter directs the bounding sheet to a storage area.

12. An apparatus, comprising:

an automated banking machine that operates responsive at least in part to data read from data bearing records, wherein the machine includes:

a housing, an input device supported by the housing, wherein the input device is operative to receive inputs from users of the automated banking machine, wherein the input device includes a card reader that is operative to read data from user cards, wherein read data from user cards is usable to identify a financial account, an output device operable to provide outputs, a processor associated with the automated banking machine that is operatively coupled with the input device and output device, wherein the processor is operative to cause a determination to be made that card data read from a user card through operation of the card reader corresponds to a financial account on which a transaction is authorized to be conducted through operation of the machine, and a financial transfer involving the financial account responsive at least in part to the determination, and a picker that is operable to separate an individual sheet from a stack of sheets in response to instructions received from the processor, the picker comprises:

a first rotatable picker member that includes a first high friction peripheral arcuate segment, where the first picker member is rotatable about an axis, a second rotatable picker member that includes a second high friction peripheral arcuate segment, wherein the second picker member is rotatable about the axis, wherein the stack includes a bounding sheet having a sheet face bounding a side of the stack wherein the first and second arcuate segments are operable to concurrently engage the sheet face, a drive in operative connection with the first and second rotatable picker members, a stripper member that is configured generally to prevent sheets other than the bonding sheet from being separated from the stack by rotation of the first and second picker members in a first rotational direction, wherein the first and second picker members are operable to be separately rotationally movable about the axis responsive to operation of the drive;

a centering sensor;

a control circuit operatively coupled with the drive and the centering sensor;

wherein the at least one centering sensor is configured to sense a position of a bounding sheet separated from the sheet stack relative to a center of a sheet path; and wherein the control circuit is operable to cause the drive to move the first and second picker members in an axial direction to move the sheet in engagement with the first and second picker members to be centered relative to the sheet path responsive to the centering sensor sensing that the separated bounding sheet is not centered with the sheet path.

13. An apparatus, comprising an automated banking machine that operates responsive at least in part to data read from data bearing records, wherein the machine includes:

a housing, an input device supported by the housing, wherein the input device is operative to receive inputs from users of the automated banking machine, wherein the input device includes a card reader that is operative to read data from user cards, wherein read data from user cards is usable to identify a financial account, an output device operable to provide outputs, a processor associated with the automated banking machine that is operatively coupled with the input device and output device, wherein the processor is operative to cause a determination to be made that card data read from a user card through operation of the card reader corresponds to a financial account on which a transaction is authorized to be conducted through operation of the machine, and a financial transfer involving the financial account responsive at least in part to the determination, and a picker that is operable to separate an individual sheet from a stack of sheets in response to instructions received from the processor, the picker comprises:

a first rotatable picker member that includes a first high friction peripheral arcuate segment, where the first picker member is rotatable about an axis, a second rotatable picker member that includes a second high friction peripheral arcuate segment, wherein the second picker member is rotatable about the axis, wherein the stack includes a bounding sheet having a sheet face bounding a side of the stack, wherein the first and second arcuate segments are operable to concurrently engage the sheet face, a drive in operative connection with the first and second rotatable picker members, a stripper member that is configured generally to prevent sheets other than the bonding sheet from being separated from the stack by rotation of the first and second picker members in a first rotational direction, wherein the first and second picker members are operable to be separately rotationally movable about the axis responsive to operation of the drive;

a center member that is axially disposed intermediate of the first and second picker members;

wherein the center member is rotationally stationary relative to the first and second picker members.

14. The apparatus set forth in claim 13, further comprising:

a second drive operatively coupled with the center member;

wherein the second drive is operable to cause the center member to be axially movable.

* * * * *